(12) United States Patent  
Okada et al.

(10) Patent No.: US 9,257,367 B2  
(45) Date of Patent: Feb. 9, 2016

(54) INTEGRATED CIRCUIT DEVICE, METHOD FOR PRODUCING MASK LAYOUT, AND PROGRAM FOR PRODUCING MASK LAYOUT

(71) Applicant: Kabushiki Kaisha Toshiba, Minato-ku (JP)

(72) Inventors: Motohiro Okada, Kanagawa-ken (JP); Shuhei Sota, Kanagawa-ken (JP); Takaki Hashimoto, Kanagawa-ken (JP); Yasunobu Kai, Kanagawa-ken (JP); Kazuyuki Masukawa, Kanagawa-ken (JP); Yuko Kono, Tokyo (JP); Chikaaki Kodama, Tokyo (JP); Taiga Uno, Kanagawa-ken (JP); Hiromitsu Mashita, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 102 days.

(21) Appl. No.: 13/969,823

(22) Filed: Aug. 19, 2013

(65) Prior Publication Data

US 2014/0252639 A1  Sep. 11, 2014

(30) Foreign Application Priority Data

Mar. 7, 2013  (JP) .................................. 2013-046012

(51) Int. Cl.
*G06F 17/50* (2006.01)
*G06F 19/00* (2011.01)
(Continued)

(52) U.S. Cl.
CPC ...... *H01L 23/48* (2013.01); *G03F 1/70* (2013.01); *G06F 17/5081* (2013.01); *H01L 23/528* (2013.01); *G06F 19/00* (2013.01); *G06F 2217/12* (2013.01); *H01L 2924/0002* (2013.01)

(58) Field of Classification Search
CPC . G06F 17/5081; G06F 19/00; G06F 2217/12; G21K 5/00; G03F 1/00; H01L 23/48; H01L 23/528; H01L 2924/0002
USPC .............. 716/53, 55, 111; 700/120, 121, 110; 430/4, 5; 378/34, 35
See application file for complete search history.

(56) References Cited

U.S. PATENT DOCUMENTS 5,608,816 A * 3/1997 Kawahara et al. ............ 382/149
5,675,176 A * 10/1997 Ushiku et al. ................. 257/617
(Continued)

FOREIGN PATENT DOCUMENTS

JP   11-274158     10/1999
JP   2003-162041   6/2003
(Continued)

OTHER PUBLICATIONS

Office Action issued May 18, 2015 in Japanese Patent Application No. 2013-046012 (with English language translation).
(Continued)

*Primary Examiner* — Phallaka Kik
(74) *Attorney, Agent, or Firm* — Oblon, McClelland, Maier & Neustadt, L.L.P

(57) ABSTRACT

According to one embodiment, a method for producing a mask layout of an exposure mask for forming wiring of an integrated circuit device, includes estimating shape of the wiring formed based on an edge of a pattern included in an initial layout of the exposure mask. The method includes modifying shape of the edge if the estimated shape of the wiring does not satisfy a requirement.

9 Claims, 24 Drawing Sheets

(51) Int. Cl.
  *G21K 5/00* (2006.01)
  *G03F 1/00* (2012.01)
  *H01L 23/48* (2006.01)
  *H01L 23/528* (2006.01)
  *G03F 1/70* (2012.01)

(56) References Cited

U.S. PATENT DOCUMENTS

| | | | |
|---|---|---|---|
| 5,939,335 | A | 8/1999 | Arndt et al. |
| 6,208,008 | B1 | 3/2001 | Arndt et al. |
| 6,868,175 | B1* | 3/2005 | Yamamoto et al. ............ 382/145 |
| 6,952,818 | B2 | 10/2005 | Ikeuchi |
| 6,996,797 | B1* | 2/2006 | Liebmann et al. ............... 716/52 |
| 7,278,125 | B2 | 10/2007 | Nojima |
| 7,895,541 | B2 | 2/2011 | Nojima |
| 8,122,386 | B2 | 2/2012 | Kobayashi |
| 8,234,602 | B2 | 7/2012 | Kobayashi |
| 8,402,407 | B2 | 3/2013 | Nojima |
| 2002/0071997 | A1* | 6/2002 | Ahrens et al. ..................... 430/5 |
| 2003/0008215 | A1* | 1/2003 | Mukherjee ......................... 430/5 |
| 2003/0115569 | A1 | 6/2003 | Ikeuchi |
| 2003/0184722 | A1* | 10/2003 | Kyusho ............................. 355/55 |
| 2003/0188271 | A1* | 10/2003 | Zhuang et al. ..................... 716/2 |
| 2005/0229126 | A1* | 10/2005 | Wang et al. ........................ 716/5 |
| 2006/0008135 | A1 | 1/2006 | Nojima |
| 2008/0022244 | A1 | 1/2008 | Nojima |
| 2008/0148218 | A1* | 6/2008 | Kawakami et al. .............. 716/21 |
| 2009/0049420 | A1 | 2/2009 | Kobayashi |
| 2010/0030545 | A1* | 2/2010 | Uno et al. ......................... 703/13 |
| 2010/0159617 | A1 | 6/2010 | Kobayashi |
| 2010/0275168 | A1* | 10/2010 | Shibatani et al. .................. 716/2 |
| 2011/0175247 | A1 | 7/2011 | Nojima |
| 2012/0241834 | A1 | 9/2012 | Nakajima et al. |

FOREIGN PATENT DOCUMENTS

| | | |
|---|---|---|
| JP | 2006-23649 | 1/2006 |
| JP | 2007-33919 A | 2/2007 |
| JP | 2008-65246 | 3/2008 |
| JP | 2009-49107 | 3/2009 |
| JP | 2010-153504 | 7/2010 |
| JP | 2011-43672 A | 3/2011 |
| JP | 2011-119536 | 6/2011 |

OTHER PUBLICATIONS

Office Action issued Oct. 7, 2015 in Japanese Patent Application No. 2013-046012 (with English translation).

* cited by examiner

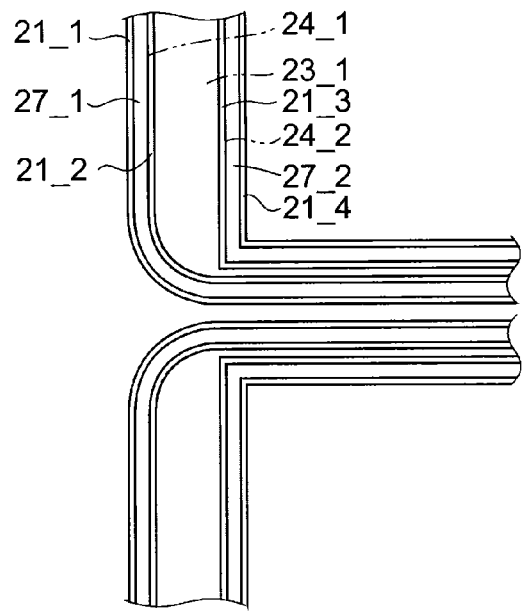
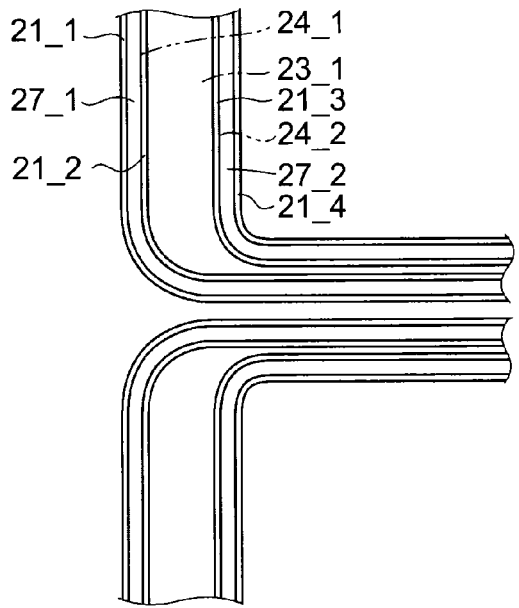
FIG. 12A          FIG. 12B
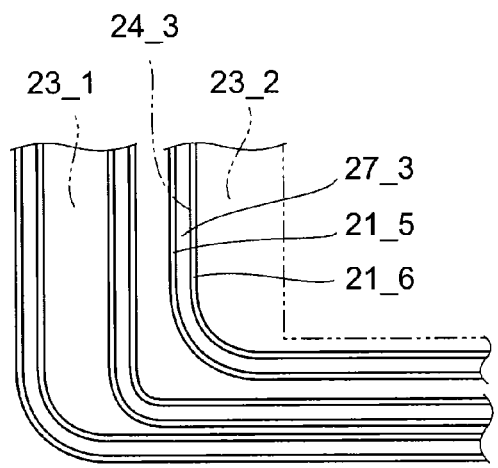
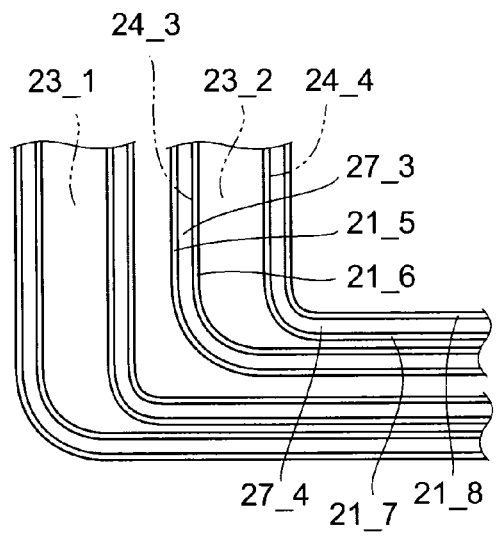
FIG. 12C          FIG. 12D

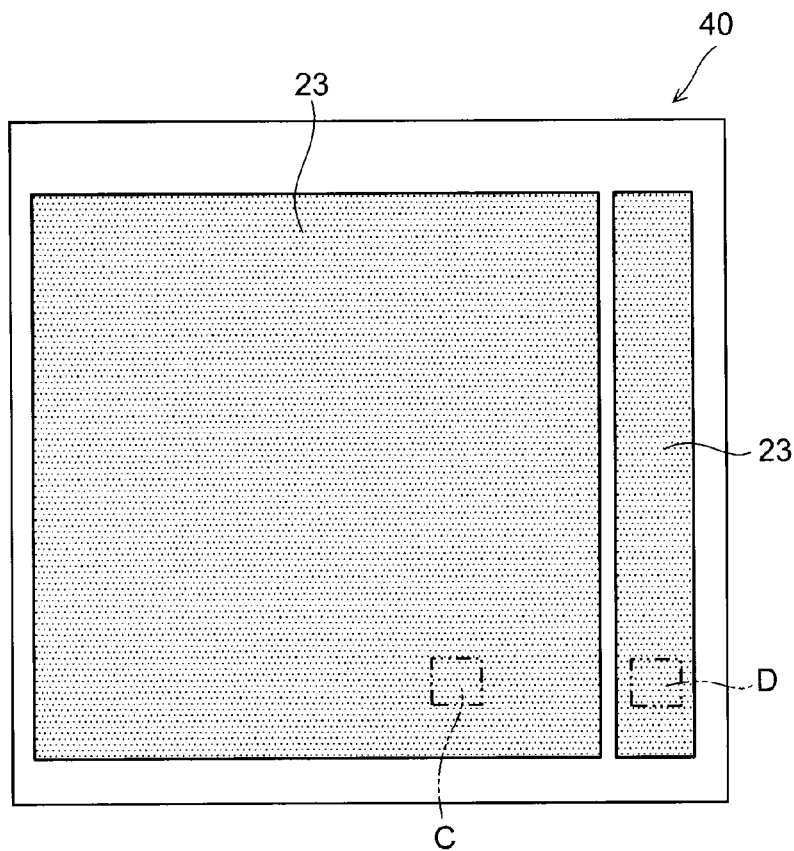
FIG. 17A
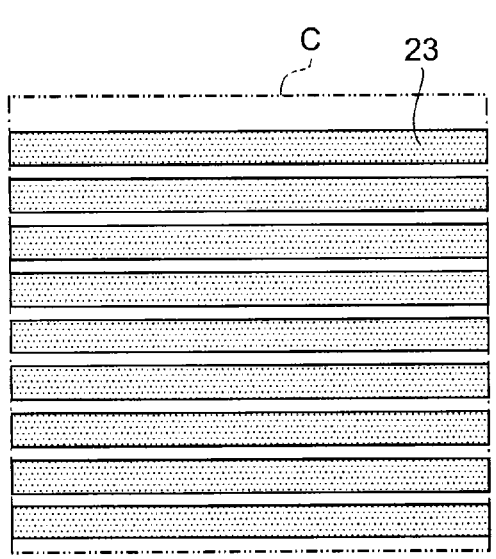 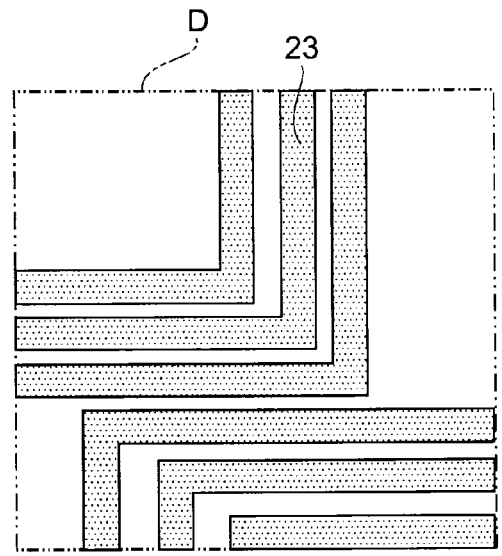
FIG. 17B                FIG. 17C

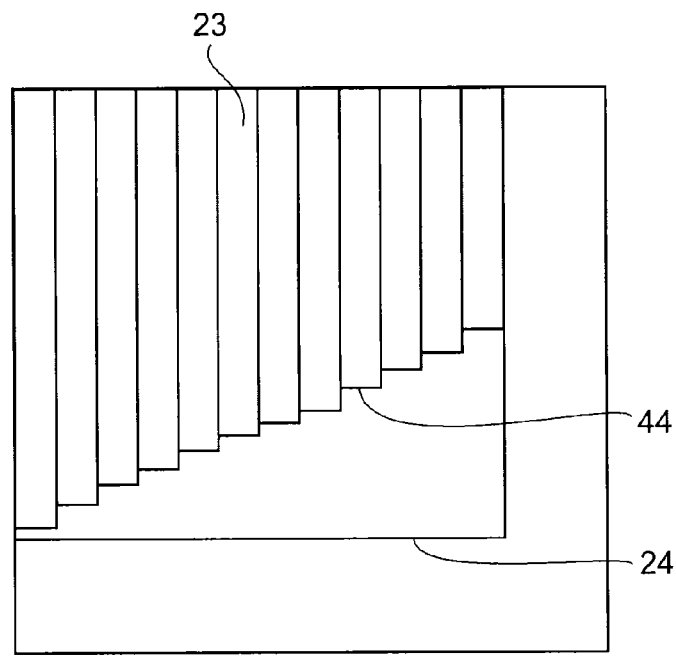
FIG. 20A
EQUAL PARTITION
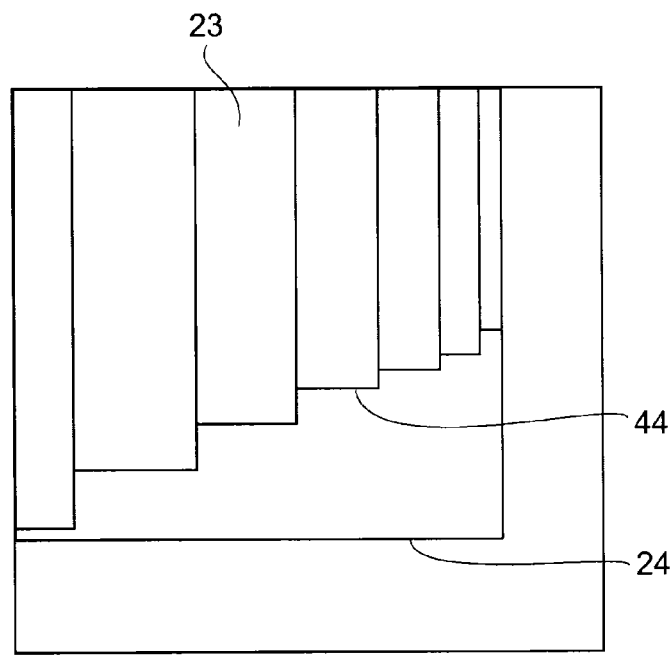
FIG. 20B
SEQUENCE FORMULA
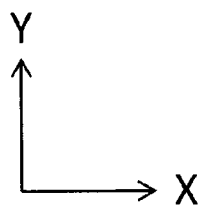

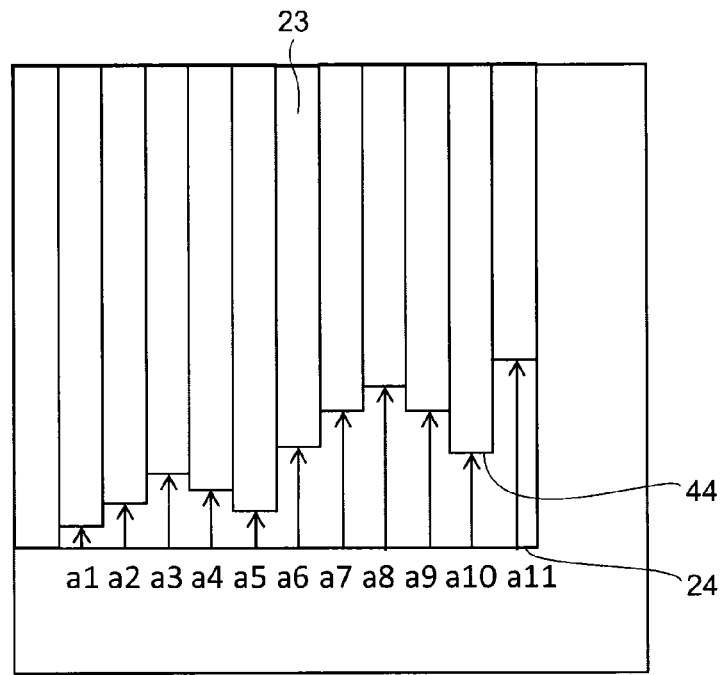
FIG. 21A EXAMPLE OF REPRESENTING CURVE BY 11 VARIABLES
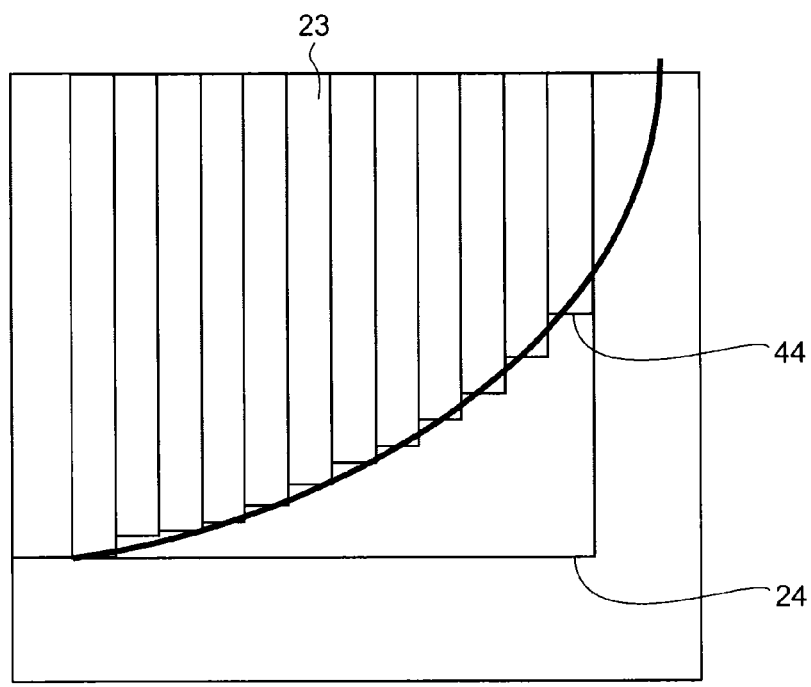
FIG. 21B EXAMPLE OF REPRESENTING CURVE BY EXPONENTIAL FUNCTION OF THREE VARIABLES

COST FUNCTION : LOW

WIRING SHAPE : BAD

COST FUNCTION : HIGH

WIRING SHAPE : GOOD

US 9,257,367 B2

INTEGRATED CIRCUIT DEVICE, METHOD FOR PRODUCING MASK LAYOUT, AND PROGRAM FOR PRODUCING MASK LAYOUT

CROSS-REFERENCE TO RELATED APPLICATIONS

This application is based upon and claims the benefit of priority from Japanese Patent Application No. 2013-046012, filed on Mar. 7, 2013; the entire contents of which are incorporated herein by reference.

FIELD

Embodiments described herein relate generally to an integrated circuit device, a method for producing mask layout, and program for producing mask layout.

BACKGROUND

Recently, with the miniaturization of integrated circuit devices, it has been difficult to process wiring in a shape as designed. Thus, even a wiring layout free from problems in the design phase may suffer from defects such as open defects (disconnection) and short defects (short circuit).

BRIEF DESCRIPTION OF THE DRAWINGS

FIG. 5A is a plan view, and FIG. 5B is a sectional view;

FIGS. 12A to 12D illustrate the relationship between the mask layout on one hand and the first sidewall and the wiring on the other in the third embodiment;

FIG. 17A is a plan view illustrating an initial layout of a core material pattern in the fourth embodiment, FIG. 17B is a partially enlarged plan view enlarging region C shown in FIG. 17A, and FIG. 17C is a partially enlarged plan view enlarging region D shown in FIG. 17A;

FIGS. 20A and 20B are plan views illustrating variables representing the edge shape of the core material pattern;

FIGS. 21A and 21B are plan views illustrating variables representing the edge shape of the core material pattern;

DETAILED DESCRIPTION

In general, according to one embodiment, an integrated circuit device includes a wiring. The wiring includes a curved portion curved from a first direction toward a second direction crossing the first direction.

In general, according to one embodiment, a method for producing a mask layout of an exposure mask for forming wiring of an integrated circuit device, includes estimating shape of the wiring formed based on an edge of a pattern included in an initial layout of the exposure mask. The method includes modifying shape of the edge if the estimated shape of the wiring does not satisfy a requirement.

Embodiments of the invention will now be described with reference to the drawings.

First, a first embodiment is described.

Figure 1:
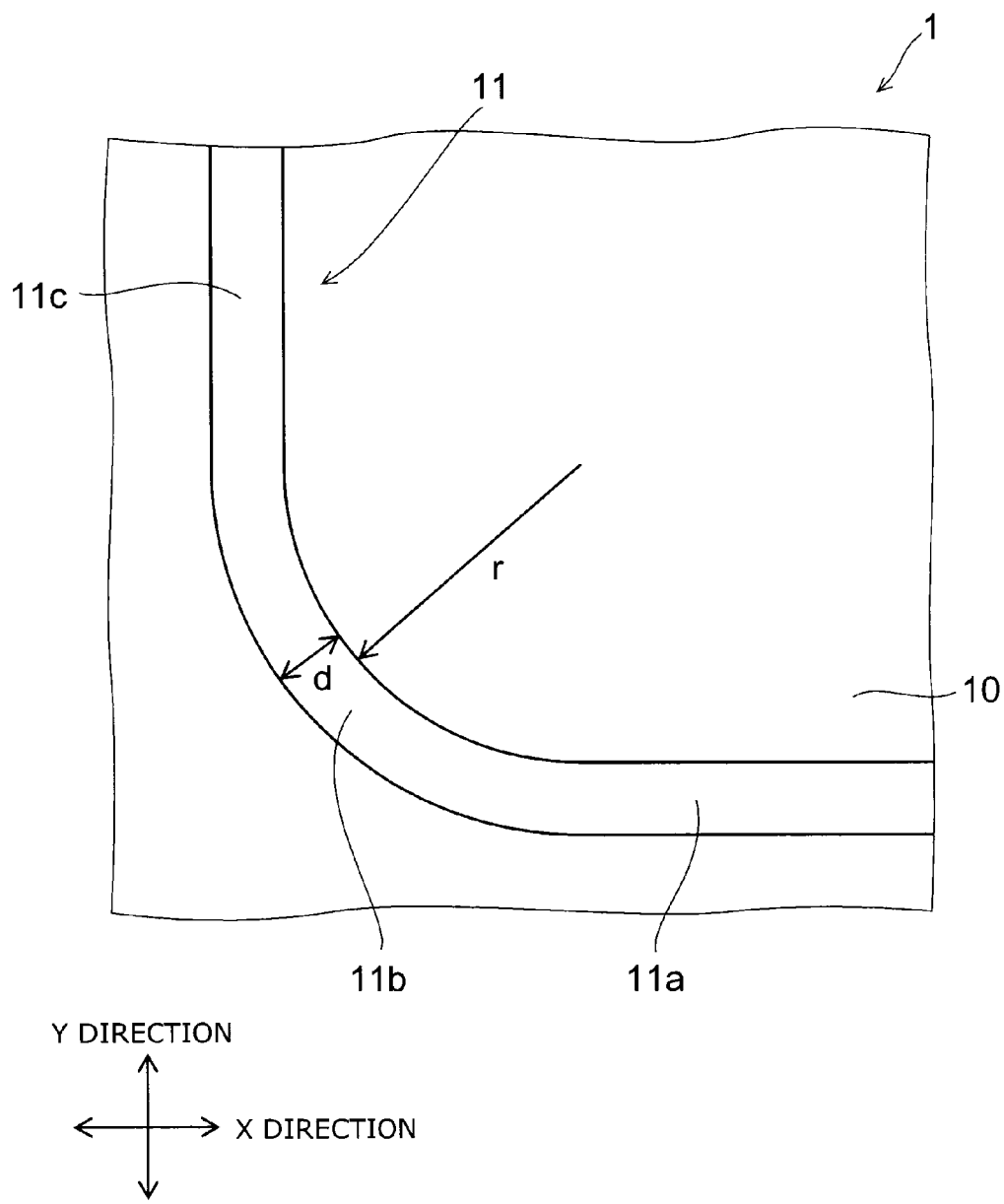
FIG. 1 is a plan view illustrating an integrated circuit device according to a first embodiment.

As shown in FIG. 1, in an integrated circuit device 1 according to the embodiment, an interlayer insulating film 10 is provided on a semiconductor substrate (not shown) such as a silicon substrate. A wiring 11 is provided on the interlayer insulating film 10. The wiring 11 is formed by lithography technique. For instance, the wiring 11 is formed by sidewall technique.

The wiring 11 is extracted from a portion on the circuit to the X direction, and then curved toward the Y direction so as to be connected to another portion. The X direction and the Y direction are orthogonal to each other. Thus, the wiring 11 includes a straight portion 11a extending in the X direction and a straight portion 11c extending in the Y direction. Furthermore, a curved portion 11b is linked between the straight portion 11a and the straight portion 11c. The curved portion 11b is curved so that its extending direction changes from the X direction to the Y direction. The straight portion 11a, the curved portion 11b, and the straight portion 11c are integrally formed.

In this specification, the term "curved" means that the curved portion 11b is curved so that the curvature radius r of the inner side surface of the curved portion 11b is larger than the width d of the curved portion 11b. In the case where the curvature radius is not constant in the curved portion 11b, its minimum is taken as the curvature radius r. In the case where the width of the curved portion 11b is not constant, its minimum is taken as the width d. In this specification, when the wiring is curved so that the curvature radius r of the inner side surface of the wiring is less than or equal to the width d of the wiring, the wiring is referred to as being "bent".

According to the embodiment, the curved portion 11b of the wiring 11 is curved. Thus, compared with the case where the curved portion 11b is bent, stress concentration on the curved portion 11b at the time of processing the wiring 11 can be suppressed. This can prevent the occurrence of open defects due to stress concentration. Furthermore, because the curved portion 11b is curved, lithography for forming the wiring 11 is easy. Moreover, in the case of forming the wiring 11 by sidewall technique, the deposition thickness of the sidewall is made uniform. Thus, contact between the sidewalls and disconnection of the sidewall can be suppressed. This can suppress the occurrence of short defects and open defects in the wiring 11 formed using the sidewall as a mask. As a result, defects of the wiring 11 associated with lithography and processing can be suppressed without entirely thickening the wiring 11 or entirely increasing the distance between the wirings 11.

Next, a second embodiment is described.

The embodiment is a method for producing a mask layout of an exposure mask for manufacturing wiring of an integrated circuit device.

In the embodiment, a mask layout for forming wiring by one-stage sidewall technique and RIE (reactive ion etching) technique is produced.

First, as shown in step S1 of FIG. 2, based on the capacity of the process for manufacturing an integrated circuit device, the minimum curvature radius (hereinafter referred to as "minimum radius R") of the wiring necessary for avoiding disconnection of the wiring during processing is determined. The minimum radius R is defined on e.g. the inner side surface of the curve among the side surfaces of the wiring. Furthermore, based on the characteristics of the integrated circuit device to be manufactured, the minimum space width (hereinafter referred to as "minimum spacing S") required between the adjacent wirings in this integrated circuit device is determined. The minimum radius R and the minimum spacing S are determined by e.g. simulation.

Next, as shown in step S2, a layout of the wiring to be formed in this integrated circuit device is specified. The layout of the wiring is produced by normal methods based on the performance, design rule and the like required for the integrated circuit device.

Figure 4:
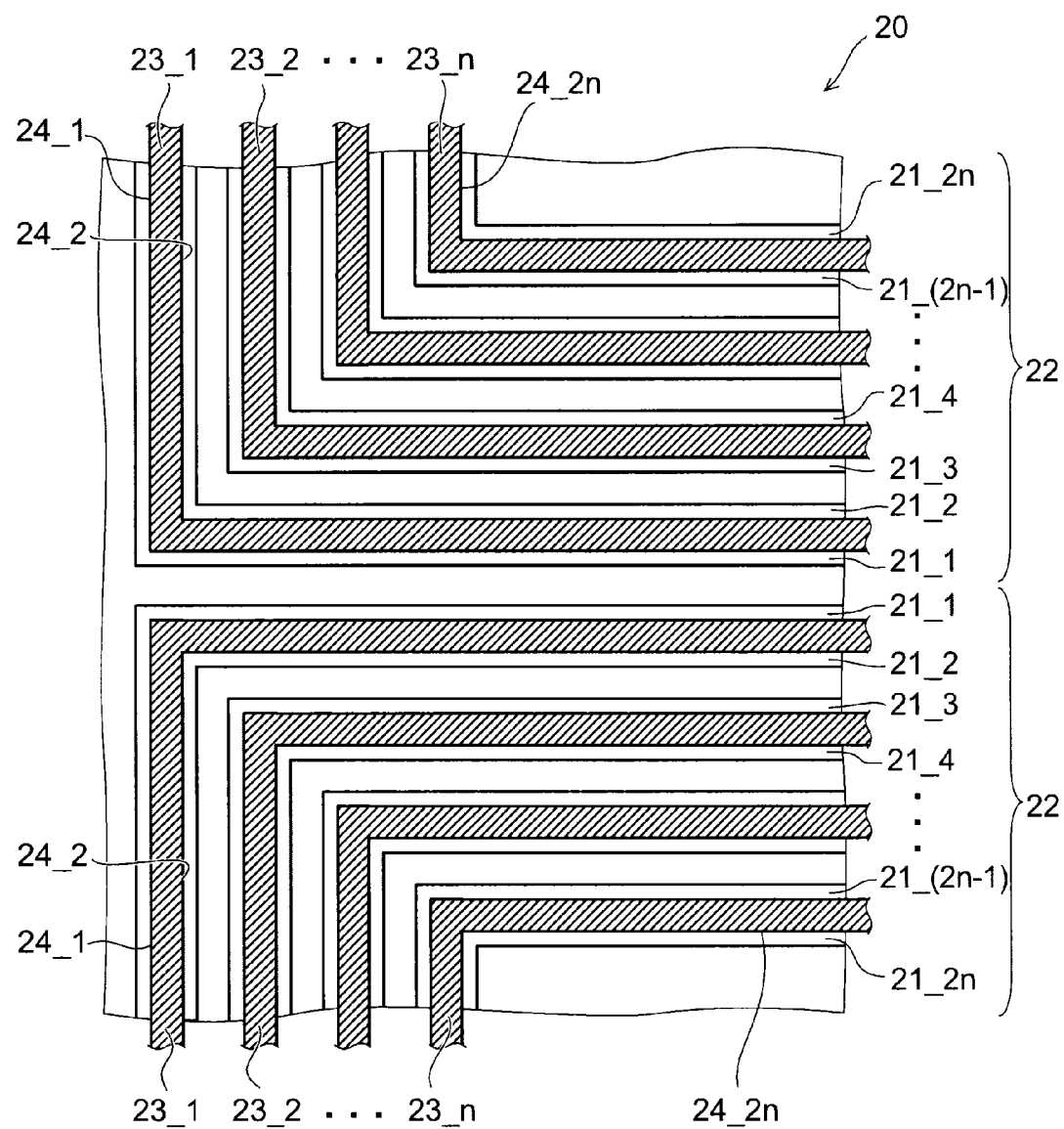
FIG. 4 is a plan view illustrating an initial layout of an exposure mask in the second embodiment.

As shown in FIG. 4, the layout of the wiring in the embodiment includes a pair of wiring groups 22. In each wiring group 22, 2n (n being an integer of 1 or more) wirings 21_1-21_2n are arranged in this order. In the following, the wirings 21_1-21_2n are also collectively referred to as "wirings 21". Similarly, also for the other constituent members, the individual notation and the collective notation are concurrently used. The layouts of the pair of wiring groups 22 are axisymmetric to each other. Each wiring 21 is bent at one site. The curvature radius of the wiring included in this wiring layout is larger than the minimum radius R. The spacing of the wirings is larger than the minimum spacing S.

Figure 2:
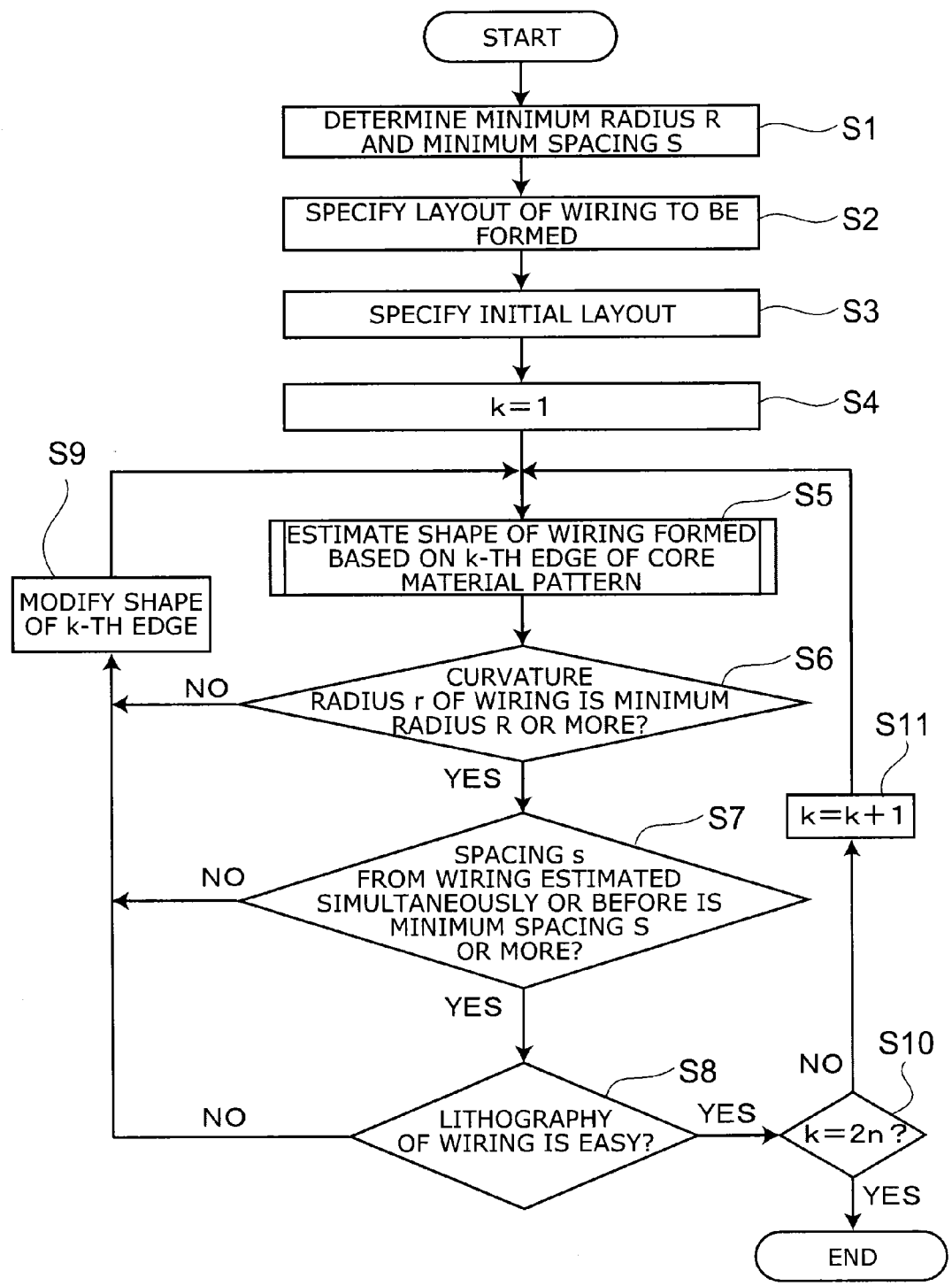
FIG. 2 is a flowchart illustrating a method for producing a mask layout according to a second embodiment.

Next, as shown in step S3 of FIG. 2 and in FIG. 4, based on the wiring layout specified in step S2, a mask layout of an exposure mask is specified. This is referred to as initial layout 20.

Here, as a prerequisite for producing a mask layout in the embodiment, a method for forming wiring 21 is briefly described. In FIG. 4, wirings formed on a wafer are superimposed on the figure showing the mask layout of the exposure mask.

As shown in FIG. 4, first, by lithography technique, a core material pattern 23 provided in the exposure mask is transferred to form a core material on a conductive film. Then, a sidewall material is deposited so as to cover the core material. Next, the sidewall material is etched back and left only on both side surfaces of the core material to form a pair of sidewalls. Then, the core material is removed. In the case of one-stage sidewall technique, this sidewall constitutes a mask material for forming wiring. That is, two mask materials are formed from one core material. Next, the sidewall (mask material) is used as a mask to perform anisotropic etching such as RIE. Thus, the conductive film is selectively removed. Accordingly, the remaining portion of the conductive film constitutes a wiring 21. At this time, the shape of the sidewall is directly transferred as the shape of the wiring 21.

If the foregoing process is ideally performed, the shape of the actually formed wiring 21 should be equal to the shape of the wiring 21 specified in step S2. The curvature radius thereof should be larger than the minimum radius R. The wiring spacing should be larger than the minimum spacing S. However, in reality, the shape of the wiring 21 may be varied by process factors and fail to satisfy the aforementioned requirement. Here, the portion of the wiring 21 failing to satisfy the requirement is difficult to extract from the wiring layout before forming the wiring 21. Thus, in the embodiment, the mask layout of the exposure mask is produced so that the actually formed wiring 21 satisfies a prescribed requirement.

Here, in the embodiment, it is assumed that lithography is faithfully performed. Thus, it is assumed that the shape of the core material pattern 23 included in the mask layout of the exposure mask is identical to the shape of the core material formed on the conductive film by the transfer of this core material pattern 23. Furthermore, it is assumed that RIE is also faithfully performed. Thus, it is assumed that the shape of the sidewall is identical to the shape of the wiring 21. For convenience of illustration, in FIGS. 4, 6A to 6D, 7A to 7C, and 8A to 8D, the core material pattern 23 of the mask layout and the wiring 21 are superimposed on the same figure. Here, the arrangement of the core material is identical to the arrangement of the core material pattern 23, and the arrangement of the sidewall is identical to the arrangement of the wiring 21.

In the embodiment, the wiring is formed by one-stage sidewall technique and RIE technique. Thus, the number of core material patterns 23 is half the number of wirings 21. That is, the number of core material patterns 23 is n. In the case where the shape of the core material pattern is linear, the number of edges of the core material patterns 23 is twice the number of core material patterns 23. That is, the number of edges of the core material patterns 23 is 2n.

Thus, the edges of the n core material patterns 23_1-23_n are referred to as edges 24_1-24_2n. For instance, in the first core material pattern 23_1, the edge facing the opposite side from the second core material pattern 23_2 is referred to as edge 24_1, and the edge facing the core material pattern 23_2 is referred to as edge 24_2. In the second core material pattern 23_2, the edge facing the core material pattern 23_1 is referred to as edge 24_3, and the opposite side is referred to as edge 24_4. In general, in the j-th (j being an integer of 2 to n−1) core material pattern 23_j, the edge facing the core material pattern 23_(j−1) is referred to as edge 24_(2j−1), and the edge facing the core material pattern 23_(j+1) is referred to as edge 24_2j. Finally, in the n-th core material pattern 23_n, the edge facing the opposite side from the core material pattern 23_(n−1) is referred to as edge 24_2n.

In the initial layout 20, the 2n edges 24_1-24_2n are sequentially arranged. In the case of forming wirings 21 by sidewall technique, each wiring 21 is formed based on one of the edges 24. The shape of the wiring 21 depends on the shape of this edge 24. In the embodiment, the thickness of the sidewall formed on the side surface of the core material corresponding to the edge 24 of the core material pattern 23 is calculated. Thus, while verifying the shape of the wiring 21 formed based on the edge 24, the shape of the edge 24 is modified as necessary. Then, the shape of the edges 24 is fixed one by one in the order of the arrangement thereof.

First, proceeding to step S4 of FIG. 2, parameter k is set to 1.

Next, proceeding to step S5, the shape of the wiring formed based on the edge 24_k, i.e., in this case, the shape of the wiring 21_1 formed based on the edge 24_1 of the core material pattern 23_1, is estimated. In the embodiment, the wiring is formed by one-stage sidewall technique and RIE technique. Thus, the sidewall formed on the side surface of the core material formed based on the core material pattern 23 constitutes a mask material, and the shape of the mask material constitutes the shape of the wiring 21. Accordingly, the shape of the wiring 21 depends on the shape of the edge 24 and the thickness distribution of the sidewall. The shape of the edge 24 is given by the initial layout 20. Thus, the shape of the wiring 21 can be estimated by determining the thickness distribution of the sidewall. The thickness of the sidewall at each position is determined by the deposition amount of the sidewall material at that position.

Figure 3:
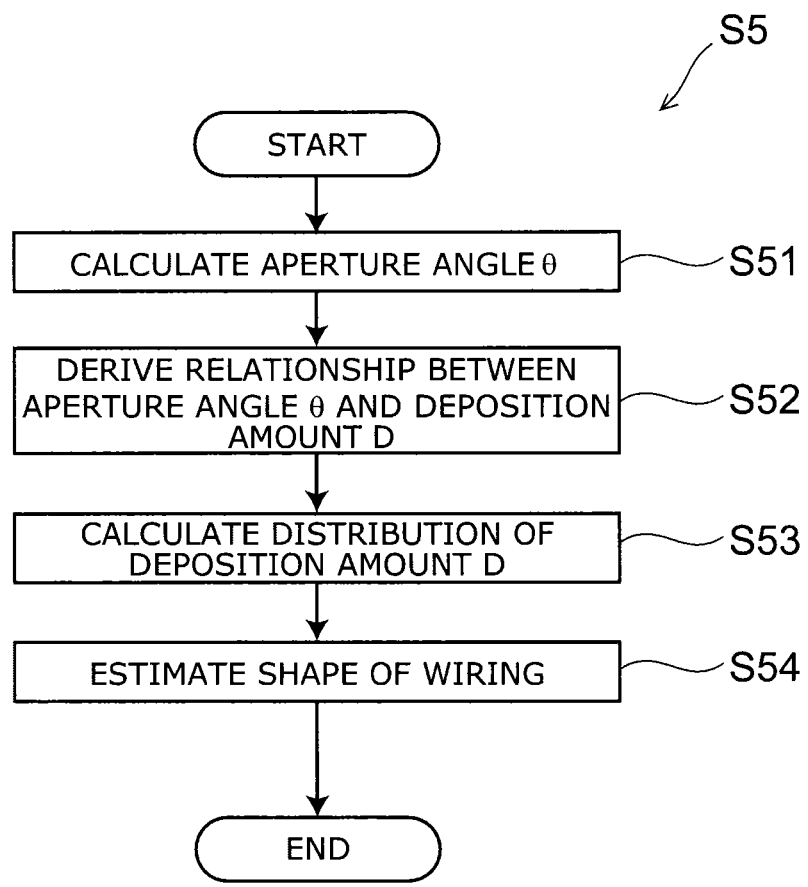
FIG. 3 is a flowchart illustrating a subroutine corresponding to step S5 of FIG. 2.

The specific content of the process shown in step S5 is shown in FIG. 3.

Figure 5A:
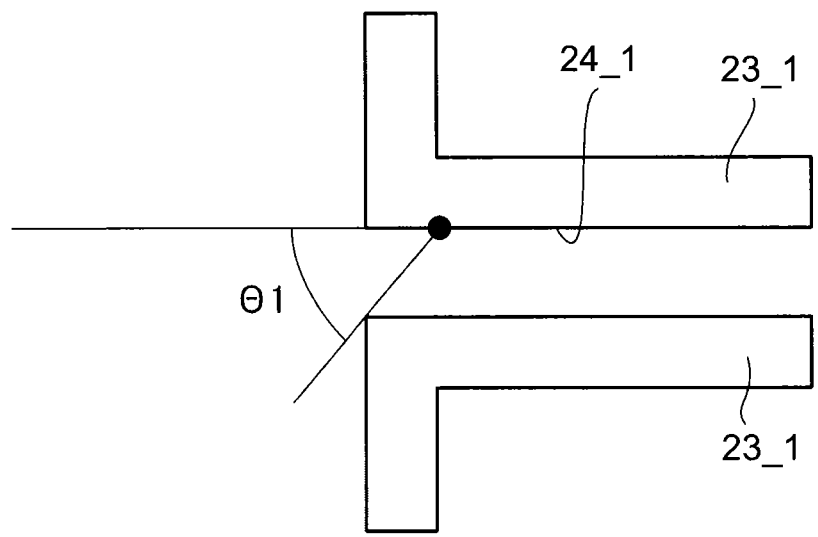
FIGS. 5A and 5B illustrate a method for estimating the deposition amount, where
Figure 5B:
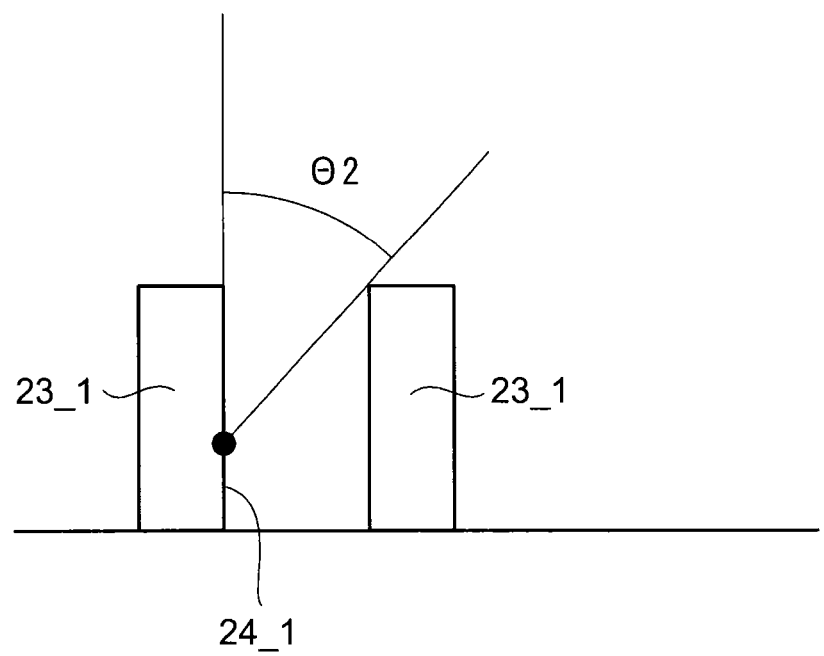

As shown in step S51 of FIG. 3 and in FIGS. 5A and 5B, based on the layout of the core material supposed to be formed from the core material pattern 23_1 of the initial layout, planar aperture angles θ1 and θ2 are calculated for a plurality of points on the side surface of the core material. Here, in FIGS. 5A and 5B, for convenience, the core material is represented by the core material pattern 23_1, and the side surface of the core material is represented by the edge 24_1. From the planar aperture angles θ1 and θ2, a three-dimensional aperture angle θ is determined. The aperture angle θ is an index representing the angle range of sight not blocked by the foundation and the core material as viewed from a certain viewpoint.

Next, as shown in step S52, the relationship between the aperture angle θ and the deposition amount D of the sidewall material is determined. For instance, by simulation, for a plurality of points at which the aperture angle θ is determined, the deposition amount D is estimated. Then, by least square technique, the relationship between the aperture angle θ and the deposition amount D is determined and expressed like the following Equation 1. In the following Equation 1, α and β are coefficients. In this case, as the number of points taken in the simulation becomes larger, the accuracy of the following Equation 1 becomes higher.

$$D = \alpha + \beta \times \theta \quad \text{[Equation 1]}$$

Next, as shown in step S53, the distribution of the deposition amount D is determined. For instance, for several points on the side surface of the core material, the deposition amount D is determined by substituting the value of the aperture angle θ into the above Equation 1. The outer border of the sidewall determined by this deposition amount D is plotted on a planar diagram. Such plots are connected by a smooth curve. Thus, the shape of the sidewall is determined. This shape of the sidewall constitutes the shape of the wiring 21. Thus, the shape of the wiring 21_1 formed based on the edge 24_1 is estimated.

Figure 6A:
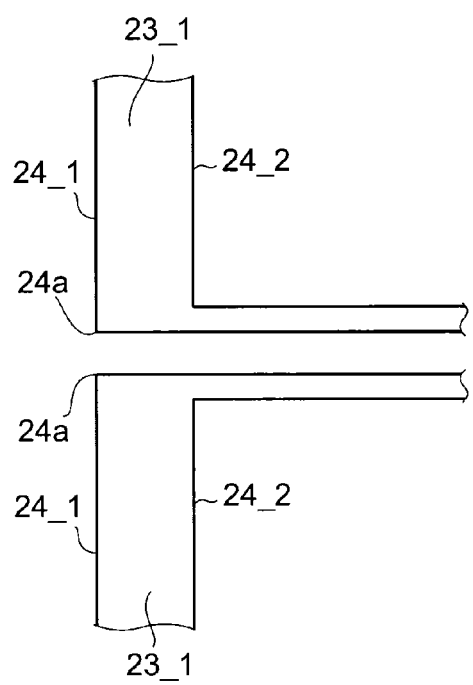
FIGS. 6A to 6D illustrate the relationship between the mask layout and the wiring in the second embodiment.
Figure 6B:
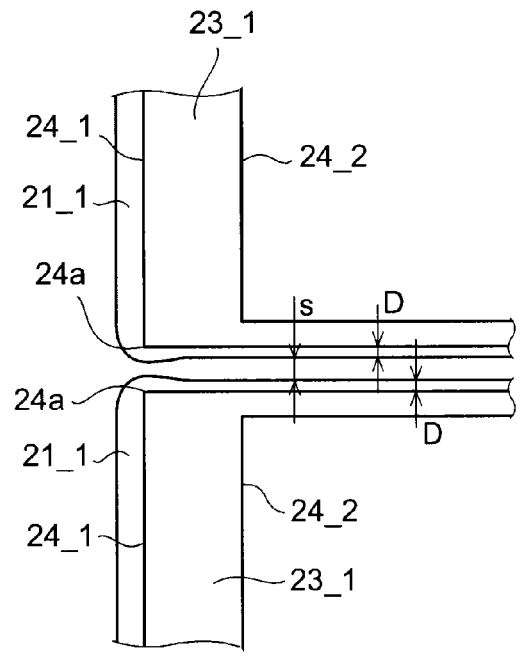

As shown in FIGS. 6A and 6B, at the edge 24_1, the aperture angle θ is larger in the region where the core materials are not opposed to each other than in the region where the core materials are opposed to each other. Thus, the sidewall is formed thicker in the region where the core materials are not opposed to each other. Accordingly, near the bending point 24a of the edge 24_1, the distance s between the wirings 21_1 is made shorter.

Next, as shown in step S6 of FIG. 2, it is determined whether the curvature radius r of the wiring 21_1 formed based on the first edge 24_1 is more than or equal to the minimum radius R. In the case where the curvature radius r is more than or equal to the minimum radius R, i.e., in the case of r≥R, the process proceeds to step S7. In the case where the curvature radius r is less than the minimum radius R, i.e., in the case of r<R, the process proceeds to step S9. In the embodiment, it is assumed that the curvature radius r of the wiring 21_1 is more than or equal to the minimum radius R.

In step S7, it is determined whether the spacing s from the wiring 21 with the shape estimated simultaneously with or prior to the wiring 21_1 is more than or equal to the minimum spacing S. For the wiring 21_1, there is no wiring with the shape previously estimated. Thus, in the case where an adjacent group 22 exists, the determination is performed for the spacing s from the first wiring 21_1 of that group 22. Then, in the case where the spacing s is always more than or equal to the minimum spacing S, the process proceeds to step S8. In the case where there is a portion with the spacing s less than the minimum spacing S, the process proceeds to step S9. In the embodiment, the spacing between the wirings 21_1 is made shorter near the bending point 24a of the edge 24_1. Thus, it is assumed that in this region, the spacing s is less than the minimum spacing S. Accordingly, the process proceeds from step S7 to step S9.

In step S8, it is determined whether lithography of the wiring 21 is easy in relation to the wiring with the shape estimated simultaneously with or prior to this wiring 21. In the case where it is determined that lithography is easy, the process proceeds to step S10. In the case where it is determined that lithography is not easy, the process proceeds to step S9.

Figure 6C:
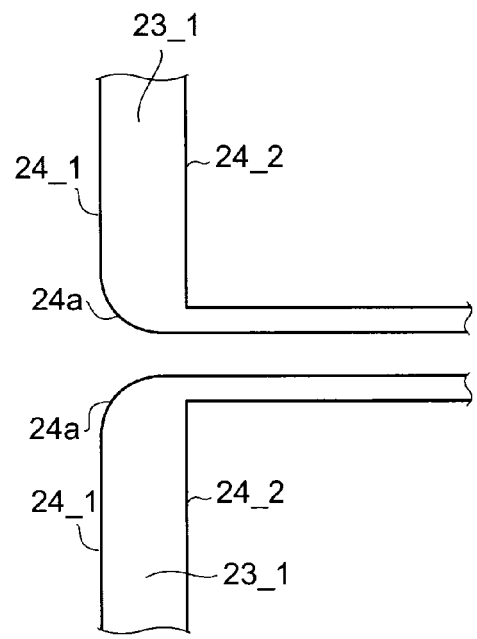

In step S9, for the purpose of enabling the wiring 21 to satisfy the requirements determined in steps S6-S8, the shape of the edge 24_1 of the core material pattern 23_1 is modified. Specifically, as shown in FIG. 6C, near the bending point 24a of the edge 24_1, in order to increase the spacing between the wirings 21_1, the edge 24_1 is trimmed and gradually curved. Here, if the curvature radius of the edge 24_1 is made larger than the deposition amount D of the sidewall material, the curvature radius of the inner side surface of the wiring 21_1 is made larger than the width of the wiring 21_1 because the width of the wiring 21_1 is equal to the deposition amount D. Thus, the wiring 21_1 is curved.

Figure 6D:
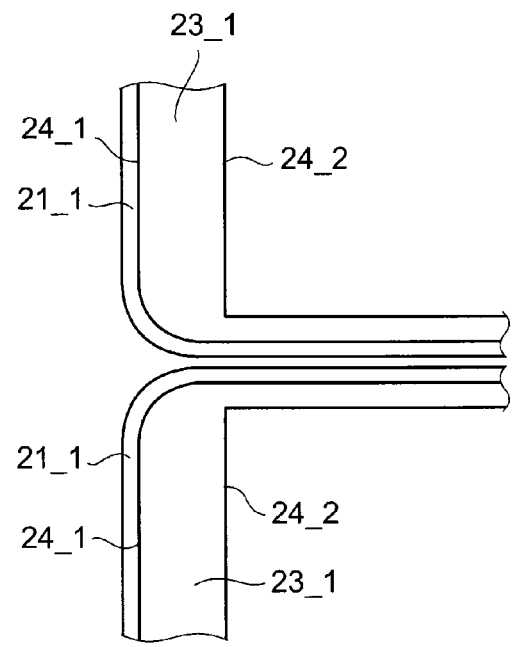

Next, returning to step S5, the process shown in steps S51-S54 of FIG. 3 is performed. Thus, as shown in FIG. 6D, based on the edge 24_1 with the modified shape, the deposition amount D is calculated, and the shape of the wiring 21_1 is estimated again.

Then, the determinations shown in steps S6-S8 are performed again. If the requirement is not satisfied in any of the determinations, then returning to step S9, the shape of the edge 24_1 of the core material pattern is further modified. Then, the loop of steps S5-S9 is cycled until the requirements shown in steps S6-S8 are satisfied. In the case where all the requirements of steps S6-S8 are satisfied, the process proceeds from step S9 to step S10. In the embodiment, it is assumed that the wiring 21_1 shown in FIG. 6D satisfies the requirements of steps S6-S8.

In step S10, unless k=2n, the process proceeds to step S11, and the value of k is incremented by 1. Thus, with k=2, for the second edge 24_2, the process of steps S5-S10 is performed.

Figure 7A:
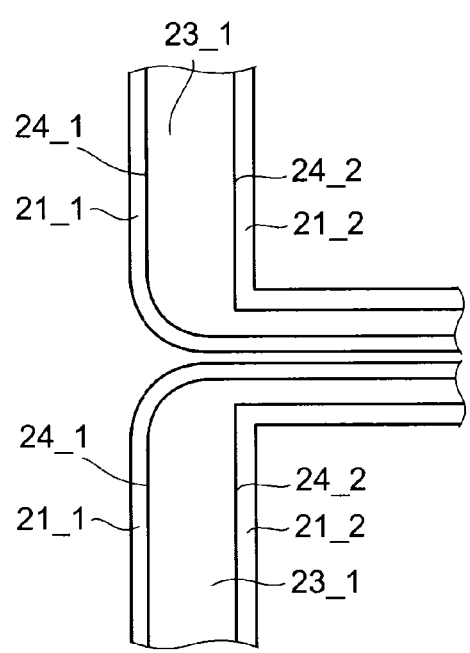
FIGS. 7A to 7C illustrate the relationship between the mask layout and the wiring in the second embodiment.

More specifically, as shown in step S5 of FIG. 2 and in FIG. 7A, the deposition amount D of the sidewall formed on the side surface of the core material corresponding to the second edge 24_2 is calculated. Thus, the shape of the wiring 21_2 formed based on the edge 24_2 is estimated. The method for calculating the deposition amount D is as described above. Next, as shown in steps S6-S8, for the wiring 21_2, it is determined whether r≥R, whether s≥S, and whether lithography is easy. In step S7, the determination is performed for the spacing s between the wiring 21_2 and the wiring 21_1 with the shape estimated and modified before. More generally, in the case where k is 2 or more, the determination is performed for the spacing s between the wiring 21_k and the wiring 21_(k−1). In the embodiment, it is assumed that the second wiring 21_2 satisfies r≥R and s≥S. However, it is assumed that lithography of the second wiring 21_2 is slightly difficult because it is not geometrically similar to the first wiring 21_1.

Figure 7B:
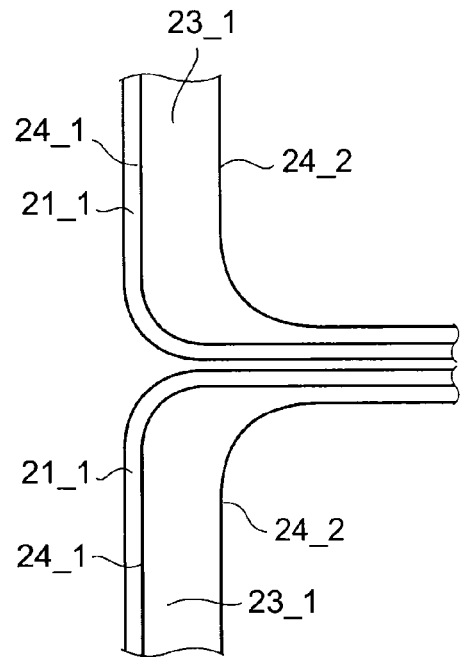
Figure 7C:
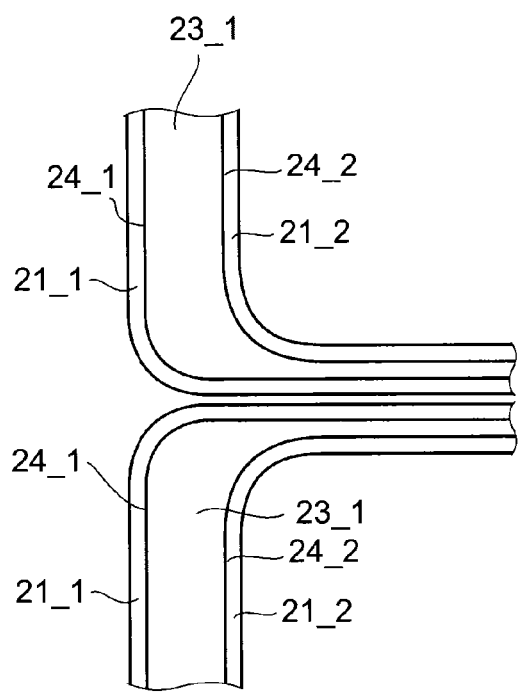
Figure 8A:
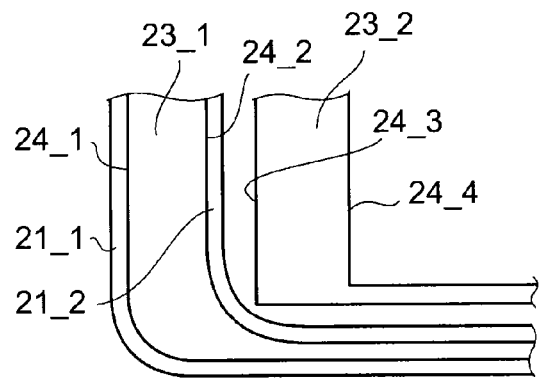
FIGS. 8A to 8D illustrate the relationship between the mask layout and the wiring in the second embodiment.

Thus, the process proceeds from step S8 to step S9. Then, as shown in FIG. 7B, the shape of the edge 24_2 is modified so as to be curved along the edge 24_1. Next, returning to step S5, as shown in FIG. 7C, based on the edge 24_2 with the modified shape, the shape of the wiring 21_2 is estimated again. Then, if the wiring 21_2 now satisfies the requirements of steps S6-S8, the process proceeds via step S10 to step S11, and k is set to 3. Next, the shape of the wiring 21_3 formed based on the third edge 24_3 is estimated. As shown in FIG. 8A, the third edge 24_3 is the edge of the second core material pattern 23_2 on the core material pattern 23_1 side.

First, as shown in step S5 of FIG. 2, the shape of the wiring 21_3 formed on the edge 24_3 is estimated. The method for estimation is as described above.

Figure 8B:
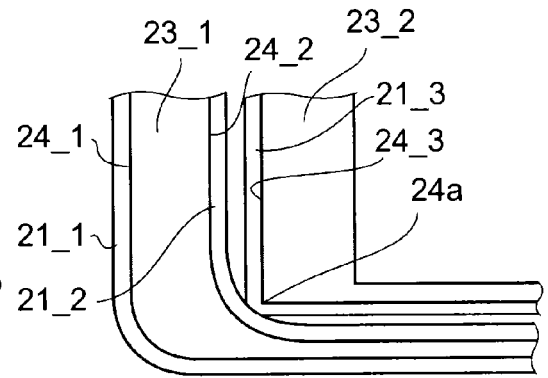
Figure 8C:
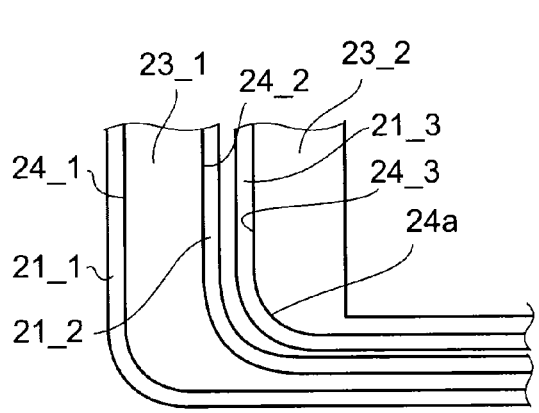

As shown in FIG. 8B, it is assumed that the wiring 21_3 is brought into contact with the wiring 21_2 formed on the edge 24_2 near the bending point 24a of the edge 24_3. Thus, in step S7, the requirement of s≥S is not satisfied. Accordingly, the process proceeds to step S9. Then, as shown in FIG. 8C, the shape of the edge 24_3 is modified. Specifically, near the bending point 24a, the edge 24_3 is trimmed and gradually curved. Then, in step S5, the shape of the wiring 21_3 is estimated again. In steps S6-S8, if the shape of the wiring 21_3 satisfies each requirement, the process proceeds via step S10 to step S11, and k is set to 4.

Figure 8D:
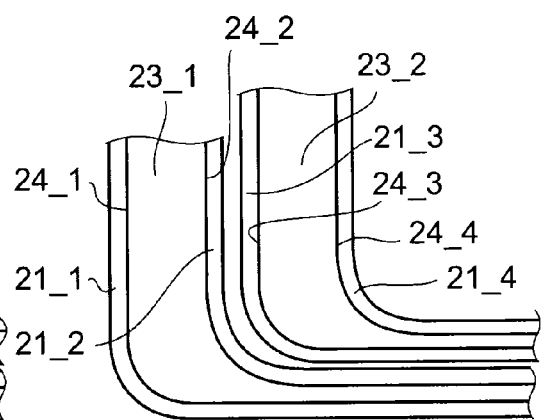

Next, as shown in FIG. 8D, the shape of the wiring 21_4 formed based on the fourth edge 24_4 is estimated. Then, the shape of the edge 24_4 is modified so that the wiring 21_4 satisfies the requirements shown in steps S6-S8. For instance, like the edge 24_2, in order to facilitate lithography of the wiring 21_4, the edge 24_4 is modified so as to be curved along the edge 24_3.

Subsequently, likewise, with the value of k incremented one by one, the shape of the edge 24_k is modified as necessary and sequentially fixed so that the wiring 21_k formed based on the edge 24_k satisfies the requirements shown in steps S6-S8. Then, if the wiring 21_2n based on the 2n-th edge 24_2n satisfies the requirements of steps S6-S8, the production of the mask layout according to the embodiment is completed.

According to the embodiment, in step S2 of FIG. 2, a layout of the wiring 21 to be formed is specified. In step S3, the initial layout 20 of the core material pattern 23 for forming the wiring 21 by one-stage sidewall technique is specified. Thus, the edge 24 is specified. Then, in the process shown in steps S5-S9, the shape of the edge 24 is modified as necessary so that the shape of the wiring 21 formed based on this edge 24 satisfies the prescribed requirement. Simultaneously, the shape of the edges 24 is sequentially fixed one by one.

Thus, for one edge 24, the process of estimating the shape of the wiring 21 shown in step S5 and the process of modifying the edge 24 shown in step S9 are repeated until the shape of the wiring 21 satisfies the requirements shown in steps S6-S8. This repetition is performed in the order of the arrangement of the edges 24 for all the edges 24 included in the initial layout 20. That is, assuming the edges 24 with the shape already fixed, the shape of the next edge 24 is fixed. Thus, the shape of all the edges 24 is fixed. As a result, it is possible to reliably produce a mask layout such that all the wirings 21 satisfy the prescribed requirement. In particular, as in the fourth embodiment described later, an algorithm for determining the edge 24 of the core material pattern 23 can be used. Then, a mask layout free from trouble in the wiring 21 can be automatically produced by a computer.

Next, a third embodiment is described.

Like the above second embodiment, the embodiment is also a method for producing a mask layout used to form wiring of an integrated circuit device by RIE technique.

However, in the embodiment, in contrast to the second embodiment, the wiring is formed by two-stage sidewall technique.

The method for producing a mask layout according to the embodiment is also performed in accordance with the flowchart shown in FIG. 2. However, the embodiment assumes that the wiring is formed by two-stage sidewall technique. Thus, the content of each process of steps S2, S3, and S5 is different from that of the above second embodiment.

First, as shown in step S1 of FIG. 2, the minimum radius R and the minimum spacing S are determined.

Next, as shown in step S2, a layout of the wiring to be formed is specified.

Figure 10:
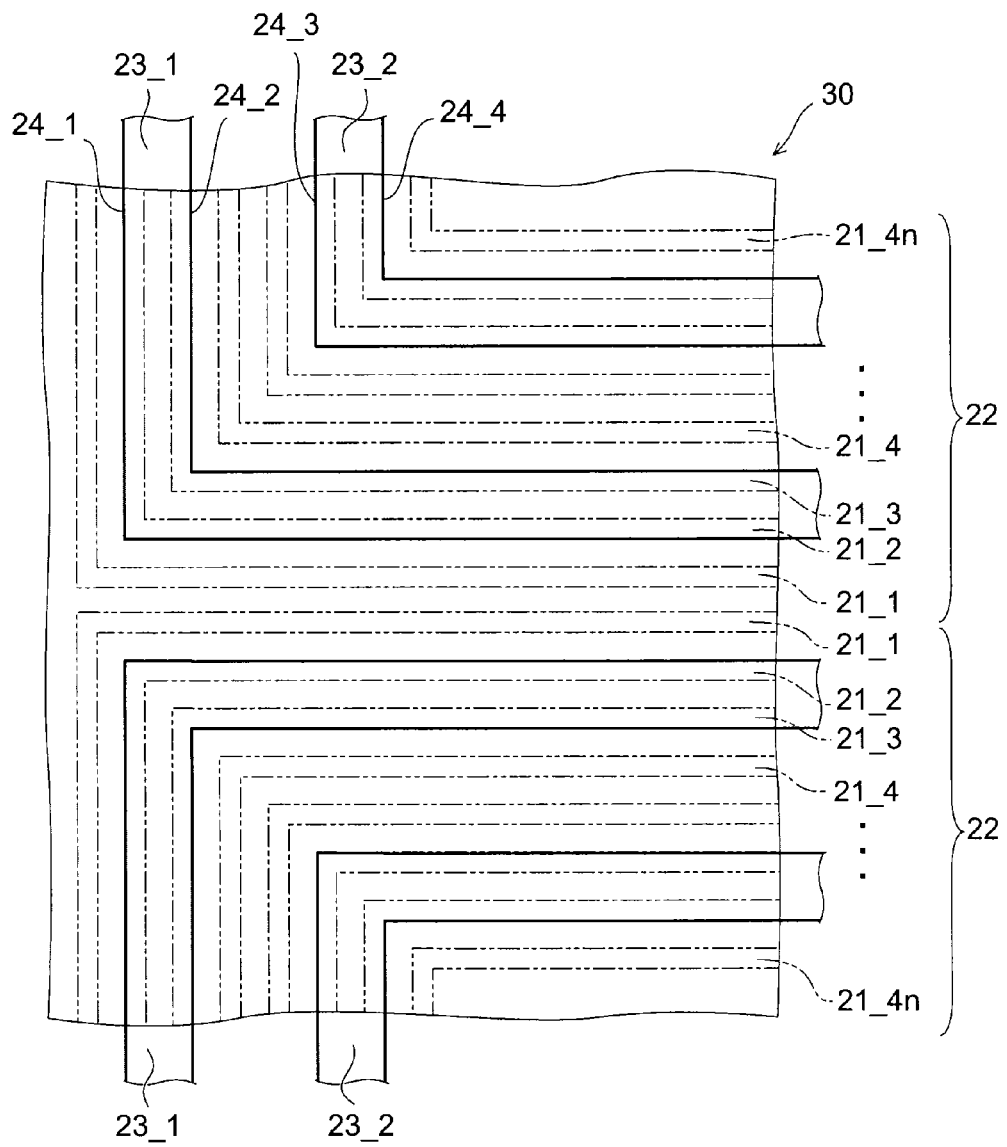
FIG. 10 is a plan view illustrating an initial layout of an exposure mask in a third embodiment.

For instance, as shown in FIG. 10, in this layout of the wiring, 4n (n being an integer of 1 or more) wirings 21_1-21_4n are arranged in this order. That is, the number of wirings 21 is a multiple of 4. A pair of groups 22 each composed of wirings 21_1-21_4n are provided so as to be axisymmetric to each other.

Next, as shown in step S3 of FIG. 2 and in FIG. 10, an initial layout of an exposure mask is specified. In the case of forming the wiring by two-stage sidewall technique and RIE technique, a core material is formed on a conductive film. A pair of first sidewalls are formed on both side surfaces of the core material. Then, the core material is removed. Next, a pair of second sidewalls are formed on both side surfaces of each first sidewall. Then, the first sidewall is removed. Next, these second sidewalls are used as a mask material to perform anisotropic etching. Thus, the conductive film is selectively removed. Accordingly, the wiring is formed.

Thus, in the embodiment, in the initial layout 30, one core material pattern 23 is specified for four wirings 21. Accordingly, the number of core material patterns 23 is a quarter of the number of wirings 21. That is, the number of core material patterns 23 is n. The respective edges of these n core material patterns 23_1-23_n are referred to as edges 24_1-24_2n. Thus, 2n edges 24_1-24_2n are sequentially arranged.

Next, the process proceeds to step S4 of FIG. 2, and the parameter k is set to 1.

Next, the process proceeds to step S5. Then, by the process shown in steps S61-S63 of FIG. 9, the shape of two wirings 21_1 and 21_2 formed based on the edge 24_1 is estimated.

Figure 9:
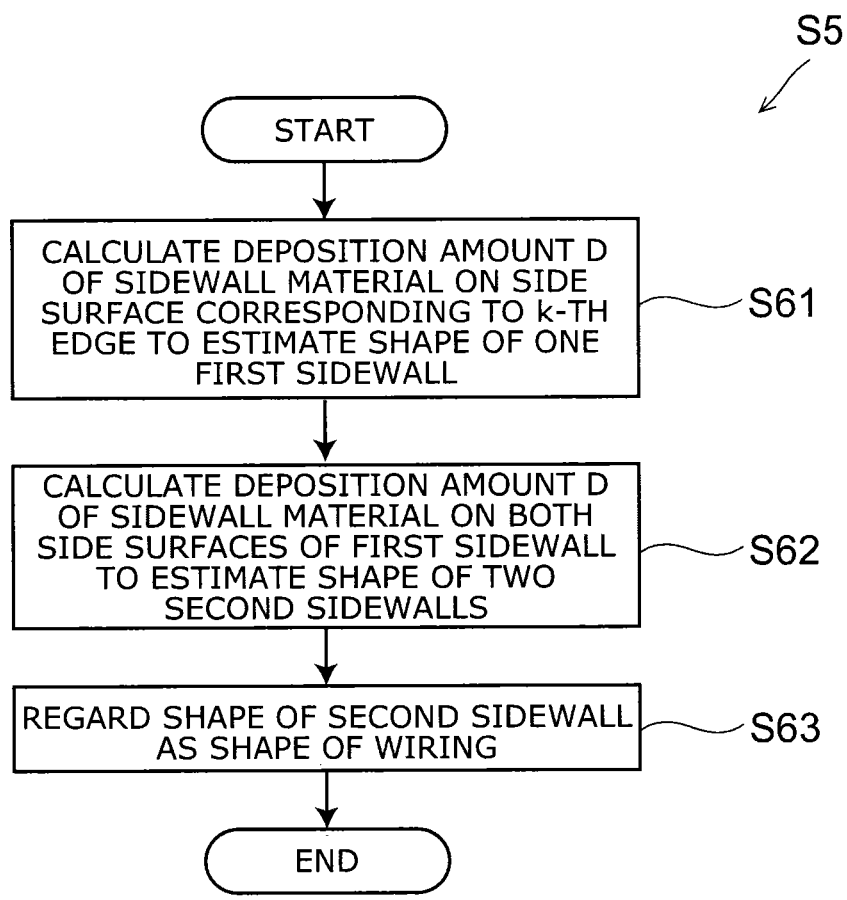
FIG. 9 is a flowchart illustrating a subroutine corresponding to step S5 of FIG. 2.
Figure 11A:
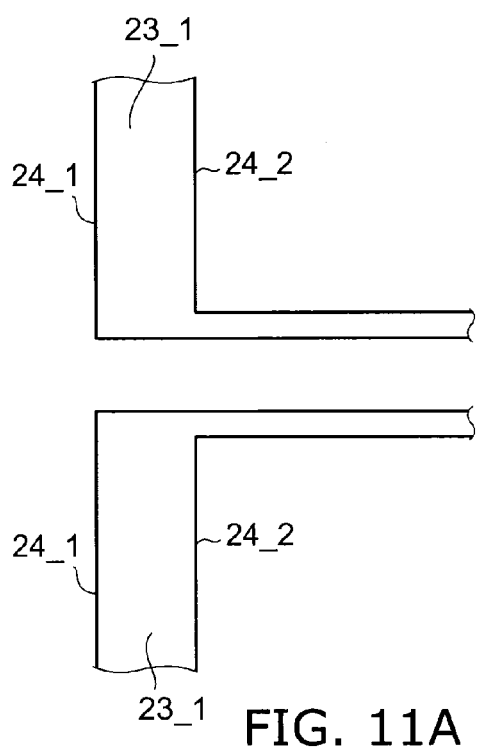
FIGS. 11A to 11D illustrate the relationship between the mask layout on one hand and the first sidewall and the wiring on the other in the third embodiment.
Figure 11B:
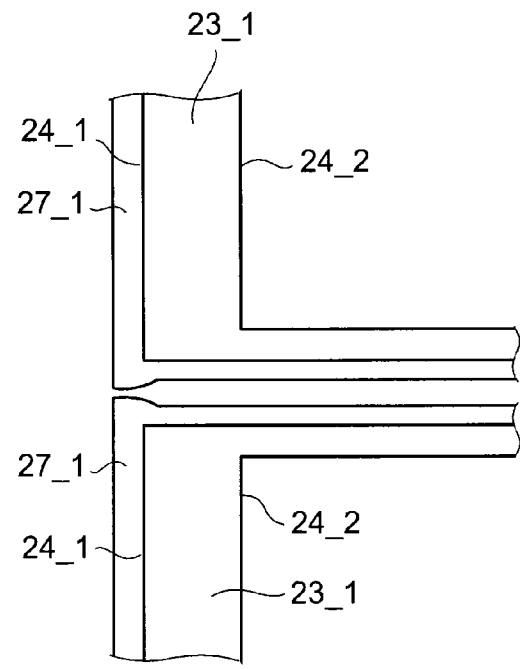

First, as shown in step S61 of FIG. 9, in FIG. 10, and in FIGS. 11A and 11B, it is assumed that a sidewall material is deposited on the side surface corresponding to the edge 24_1 to form a first sidewall 27_1. Thus, one first sidewall 27_1 is formed corresponding to one edge 24_1. Then, by a method similar to the above second embodiment, the deposition amount D of the sidewall material is calculated. More specifically, as shown in step S51 of FIG. 3, the aperture angle θ at an arbitrary point on the edge 24_1 is determined. As shown in step S52, the relationship between the aperture angle θ and the deposition amount D is determined. As shown in step S53, the distribution of the deposition amount D is determined. As a result, as shown in FIG. 11B, the shape of the first sidewall 27_1 is estimated. In the embodiment, for instance, it is assumed that the first sidewalls 27_1 are close to each other near the bending point 24a on the edges 24_1 opposed to each other on a pair of core material patterns 23_1.

Figure 11C:
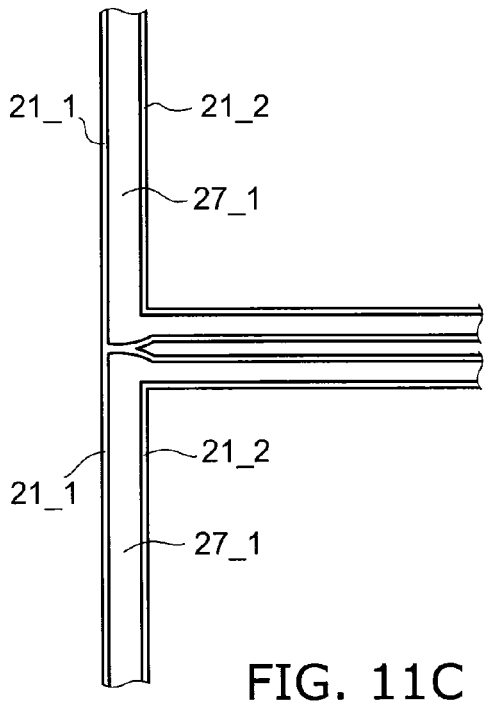

Next, as shown in step S62 of FIG. 9 and in FIG. 11C, the core material 23_1 is removed. Then, it is assumed that a sidewall material is deposited on both side surfaces of the first sidewall 27_1 to form two second sidewalls. Thus, the deposition amount D of the second sidewall is calculated. The method for calculating the deposition amount D is as described above. Thus, the shape of the two second sidewalls formed on both side surfaces of the first sidewall 27_1 is estimated. This second sidewall constitutes a mask material for forming the wiring.

Then, as show in step S63, the shape of these second sidewalls is regarded as the shape of two wirings 21_1 and 21_2. Thus, the shape of the two wirings 21_1 and 21_2 formed based on the edge 24_1 of the core material pattern 23_1 is estimated.

Figure 11D:
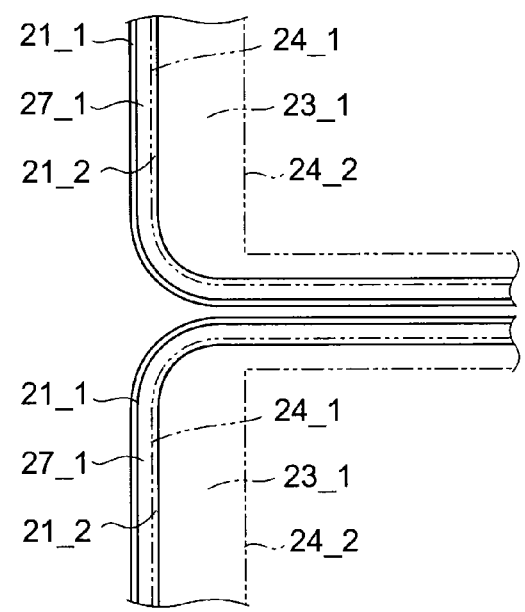

Next, as shown in steps S6-S8 of FIG. 2, it is determined whether the shape of the wirings 21_1 and 21_2 satisfies the prescribed requirement. In the embodiment, as shown in FIG. 11C, it is assumed that the wirings 21_1 are in contact with each other near the bending point 24a of the edge 24_1, and do not satisfy the requirement of s≥S shown in step S7. Thus, proceeding to step S9, the shape of the edge 24_1 of the core material 23_1 is modified. Specifically, as shown in FIG. 11D, near the bending point 24a of the edge 24_1, the edge 24_1 is trimmed and gradually curved.

Next, returning to step S5 of FIG. 2, the shape of the wirings 21_1 and 21_2 formed based on the modified edge 24_1 is estimated. Then, if the shape of the estimated wirings satisfies the requirements shown in steps S6-S8, the process proceeds via step S10 to step S11, and the value of the parameter k is set to 2.

Next, the process proceeds to step S5. Then, as shown in FIG. 12A, the shape of two wirings 21_3 and 21_4 formed based on the edge 24_2 is estimated. More specifically, as shown in step S61 of FIG. 9, the shape of the first sidewall 27_2 formed on the edge 24_2 is estimated. As shown in step S62, the shape of two second sidewalls formed on both side surfaces of the first sidewall 27_2 is estimated. As shown in step S63, the shape of these second sidewalls is regarded as the shape of the wirings 21_3 and 21_4.

If the wirings 21_3 and 21_4 do not satisfy the requirements shown in steps S6-S8, then proceeding to step S9, the shape of the edge 24_2 of the core material 23_1 is modified. Then, the loop of steps S5-S9 is cycled until the wirings 21_3 and 21_4 satisfy the requirements shown in steps S6-S8. As shown in FIG. 12B, if the wirings 21_3 and 21_4 satisfy the prescribed requirements, the process proceeds from step S10 to step S11, and the value of the parameter k is set to 3.

Next, as shown in FIG. 12C, the shape of two wirings 21_5 and 21_6 formed based on the third edge 24_3 is estimated. Then, the shape of the edge 24_3 is modified so that these wirings satisfy the requirements shown in steps S6-S8. Then, k is set to k=4.

Next, as shown in FIG. 12D, the shape of two wirings 21_7 and 21_8 formed based on the fourth edge 24_4 is estimated. Then, the shape of the edge 24_4 is modified so that these wirings satisfy the requirements shown in steps S6-S8. Then, k is set to k=5.

Subsequently, likewise, with the value of k incremented one by one, the shape of the edge 24_k is modified as necessary and sequentially fixed so that the shape of the wirings 21_(2k−1) and 21_2k formed based on the edge 24_k satisfies the requirements shown in steps S6-S8. Then, if the wirings 21_(4n−1) and 21_4n based on the 2n-th edge 24_2n satisfies the requirements of steps S6-S8, the production of the mask layout according to the embodiment is completed.

According to the embodiment, also in the case of forming the wiring by two-stage sidewall technique, it is possible to reliably produce a mask layout such that all the wirings 21 satisfy the prescribed requirement. The configuration and effect of the embodiment other than the foregoing are similar to those of the above second embodiment.

The method for producing a mask layout described in the above second and third embodiments is also applicable to the case of forming wiring by three-stage sidewall technique and higher multistage sidewall technique. In the case of forming wiring by m-stage sidewall technique (m being an integer of 1 or more), if the number of core material patterns is n, the number of edges of the core material patterns is 2n. The number of formed wirings is $2^m \times n$. Then, the shape of each of the 2n edges is modified as necessary and sequentially fixed so that the shape of the $2^{m-1}$ wirings formed based on this edge satisfies the prescribed requirement. Thus, it is possible to produce a mask layout such that all the wirings satisfy the requirement.

Next, a first variation of the third embodiment is described.

Figure 13A:
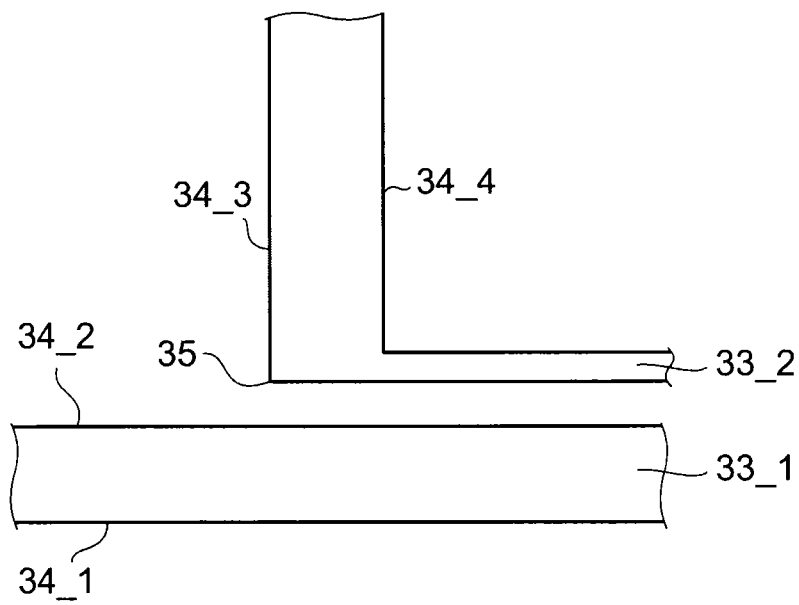
FIGS. 13A and 13B illustrate the relationship between the mask layout on one hand and the first sidewall and the wiring on the other in a first variation of the third embodiment.

As shown in FIG. 13A, in this variation, in the initial layout, the core material patterns 33_1 and 33_2 are specified. The shape of the core material pattern 33_1 is straight, and the shape of the core material pattern 33_2 is L-shaped. Part of the core material pattern 33_2 extends parallel to the core material pattern 33_1. At the bending point 35, the core material pattern 33_2 is bent toward the direction away from the core material pattern 33_1.

Such an initial layout is used to form wiring by two-stage sidewall technique. Then, on the edge 34_3 of the core material pattern 33_2 on the core material pattern 33_1 side, the first sidewall 37_3 is thickened near the bending point 35. This narrows the spacing between the wiring 31_5 formed on the side surface of the first sidewall 37_3 and the wiring 31_4 formed on the side surface of the first sidewall 37_2 on the edge 34_2 of the core material pattern 33_1 on the core material pattern 33_2 side.

Figure 13B:
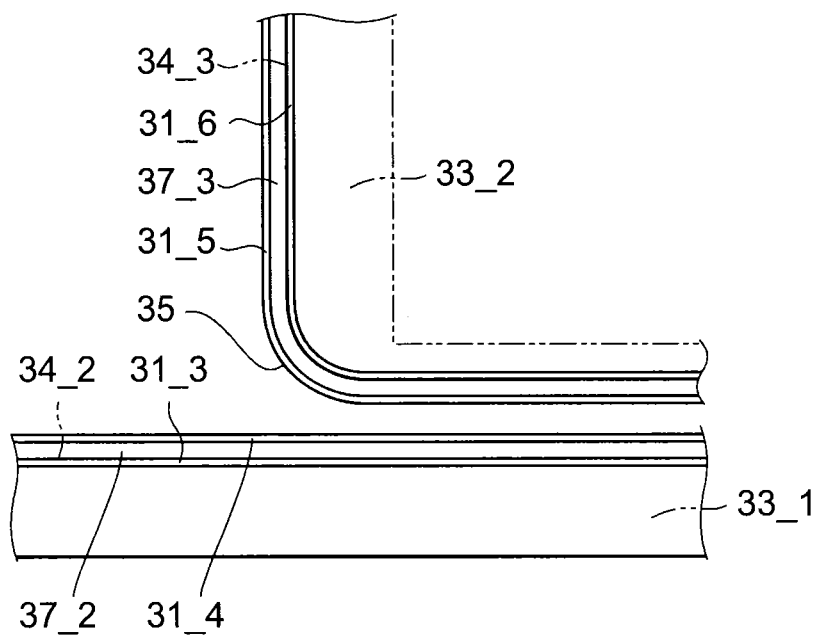

Thus, as shown in FIG. 13B, the portion of the edge 34_3 near the bending point 35 is trimmed so that the edge 34_3 is gradually curved. Here, the curvature radius of the edge 34_3 is made larger than the width of the formed wiring. Thus, a mask layout can be produced so that the shape of the wiring satisfies the prescribed requirement.

Next, a second variation of the third embodiment is described.

Figure 14A:
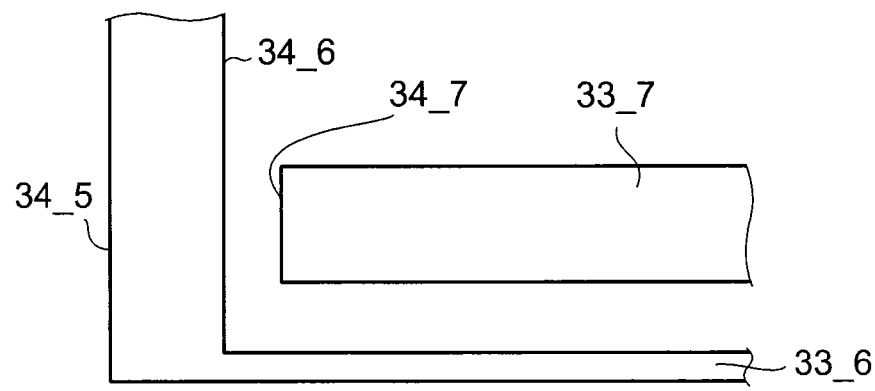
FIGS. 14A and 14B illustrate the relationship between the mask layout on one hand and the first sidewall and the wiring on the other in a second variation of the third embodiment.

As shown in FIG. 14A, in this variation, the core material patterns 33_6 and 33_7 are specified. The shape of the core material pattern 33_6 is L-shaped, and the shape of the core material pattern 33_7 is straight. One end of the core material pattern 33_7 is terminated near the inside of the bending point of the core material pattern 33_6. Such core material patterns 33_6 and 33_7 are used to form wiring by two-stage sidewall technique. This narrows the spacing between the wirings near the end portion of the core material pattern 33_7.

Figure 14B:
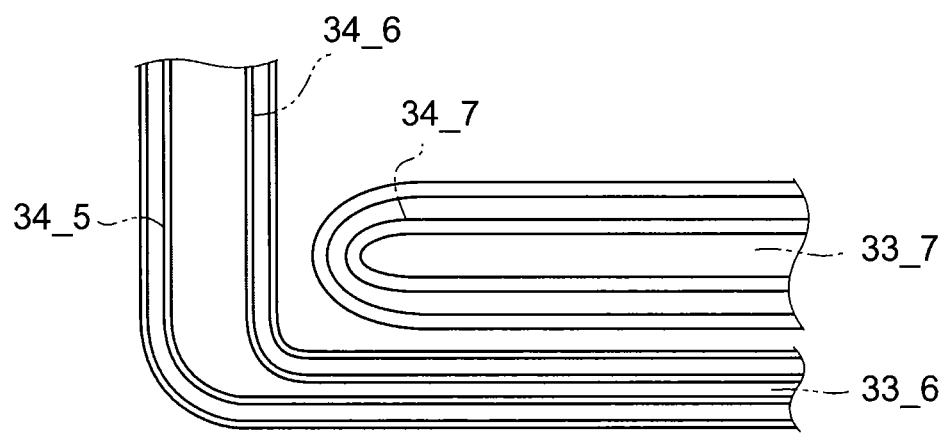

Thus, as shown in FIG. 14B, near the bending point of the core material pattern 33_6, the edges 34_5 and 34_6 of the core material pattern 33_6 are curved. Furthermore, near the end portion of the core material pattern 33_7, the edge 34_7 of the core material pattern 33_7 is curved. Thus, a mask layout can be produced so that the shape of the wiring satisfies the prescribed requirement.

As shown in the first and second variations, the method for producing a mask layout according to the above second and third embodiments is applicable even if the shapes of the wirings are not geometrically similar to each other.

Furthermore, in the example of the above second and third embodiments, the wiring is formed by RIE technique. However, the embodiments are not limited thereto. For instance, the wiring may be formed by damascene technique. In this case, the core material is formed on an insulating film. The mask material corresponds to the space between the wirings. The region between the mask materials corresponds to the wiring.

Next, a comparative example of the third embodiment is described.

Figure 15A:
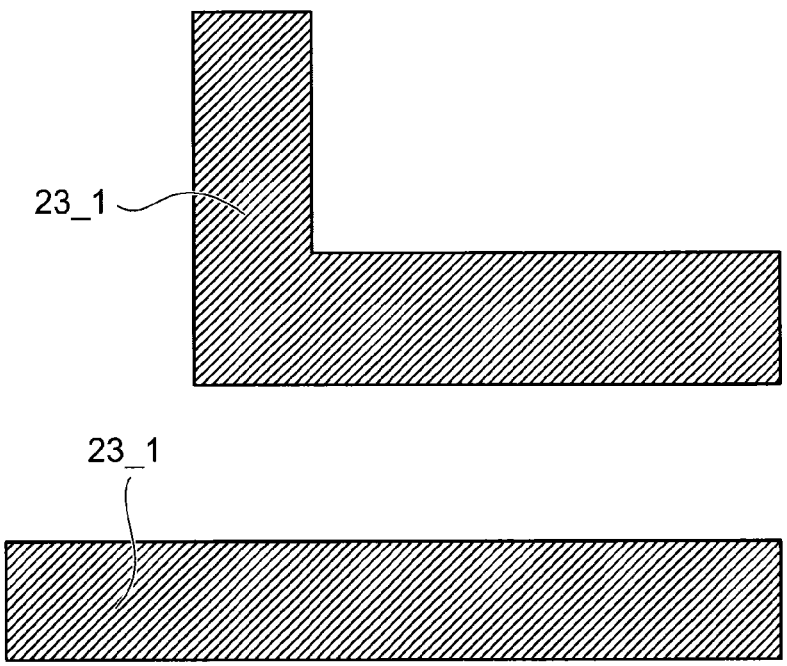
FIG. 15A is a plan view showing an initial layout in a comparative example of the third embodiment.
Figure 15B:
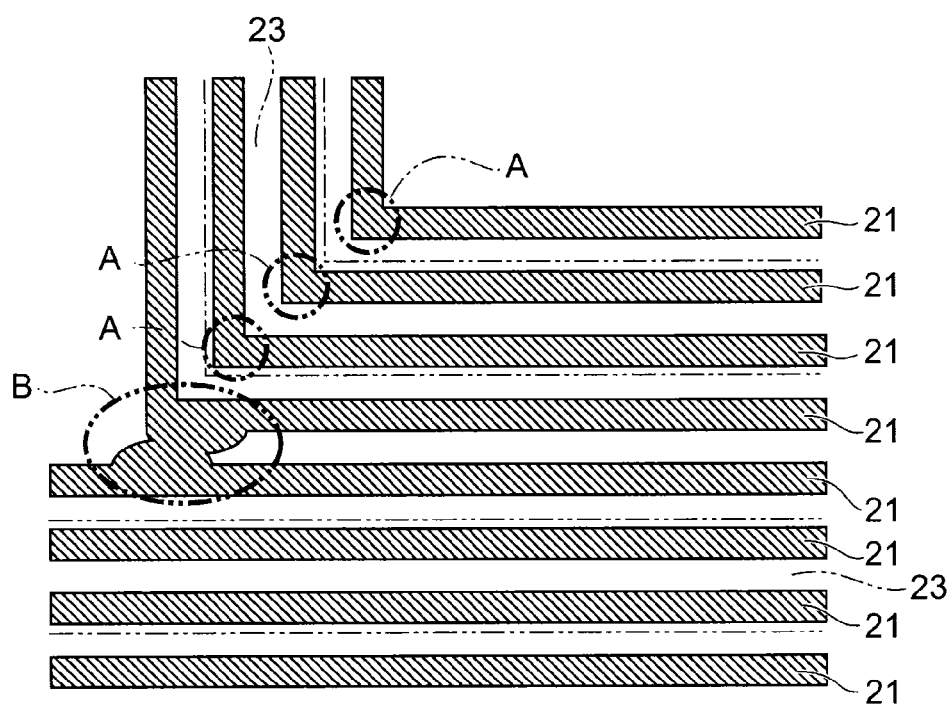
FIG. 15B is a plan view showing the wiring.

In this comparative example, the initial layout 30 shown in FIG. 15A was used without modification to perform two-stage sidewall technique and RIE technique. Thus, the wiring 21 shown in FIG. 15B was formed. In the wiring 21, in region A, the curvature radius r was less than the minimum radius R. In region B, the wirings 21 were in contact with each other, and a short defect occurred.

Thus, if the initial layout is directly used to form wiring, unexpected trouble may occur in the wiring.

In the method for producing a mask layout according to the above second embodiment, third embodiment, and variations thereof, for instance, the process shown in steps S4-S11 of FIG. 2 can be implemented by controlling a computer by a program. As the computer, for instance, a general-purpose personal computer can be used.

For instance, the process of steps S1-S3 of FIG. 2 is performed manually or by another computer. Then, the minimum radius R, the minimum spacing S, the index for determining ease of lithography, and the data representing the initial layout are inputted to a computer. Subsequently, the computer is caused to perform the process shown in steps S4-S11.

In this case, the program for controlling the computer is a program for producing a mask layout of an exposure mask for forming wiring of an integrated circuit device by sidewall technique. The program causes the computer to execute the following procedures <1>-<5>.

<1> Procedure of estimating the shape of the wiring formed based on one edge of the core material pattern included in the initial layout of the exposure mask by determining the distribution of the deposition amount of the sidewall material deposited on the side surface of the core material based on the aperture angle at the side surface of the core material (step S5).

<2> Procedure of determining whether the curvature radius of the wiring with the shape estimated by the above procedure <1> is more than or equal to a prescribed value (step S6).

<3> Procedure of determining whether the spacing of the wirings with the shape estimated by the above procedure <1> is more than or equal to a prescribed value (step S7).

<4> Procedure of determining whether lithography of the wirings with the shape estimated by the above procedure <1> is easy (step S8).

<5> Procedure of modifying the shape of the one edge in the case where any of the requirements of the above procedures <2>, <3>, and <4> is not satisfied (step S9).

Then, the program repeats the above procedures <1>-<5> until the wiring with the estimated shape satisfies all the above requirements. This repetition is performed in the order of the arrangement of the edges for the edges of all the core material patterns included in the initial layout.

Here, the specification of the initial layout shown in step S3 of FIG. 2 may also be performed in the same computer by the above program.

Next, a fourth embodiment is described.

The embodiment is an example of producing a mask layout by using an optimization algorithm to modify the initial layout. The embodiment assumes that the wiring is formed by two-stage sidewall technique.

Figure 16:
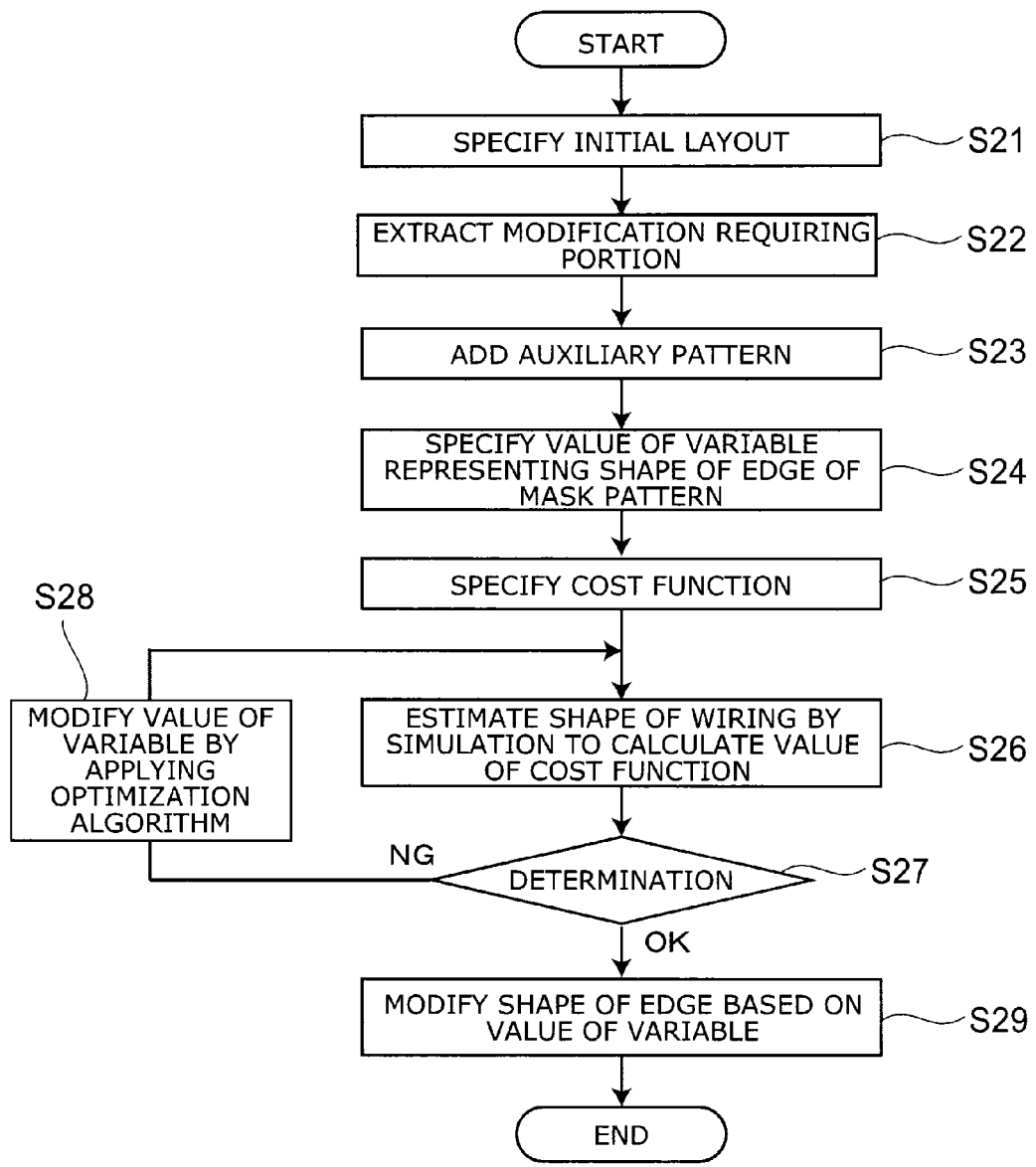
FIG. 16 is a flowchart illustrating a method for producing a mask layout according to a fourth embodiment.

First, as shown in step S21 of FIG. 16, an initial layout of an exposure mask is specified. The initial layout is calculated back from the layout of the wiring to be formed in the integrated circuit device. In the embodiment, it is assumed that the wiring is formed by two-stage sidewall technique. Thus, the initial layout includes a core material pattern.

As shown in FIG. 17B, the core material patterns in region C are equally spaced and arranged parallel to each other. On the other hand, as shown in FIG. 17C, in the core material pattern in region D, a rectangular pattern is placed in the end portion of a straight pattern.

Next, as shown in step S22 of FIG. 16, a portion likely to require modification (modification requiring portion) in the initial layout 40 is extracted. More specifically, based on the feature and the like of the shape of the initial layout 40, a region including a hot spot is extracted. The hot spot is a region where problems such as open defects and short defects are likely to occur.

Figure 18:
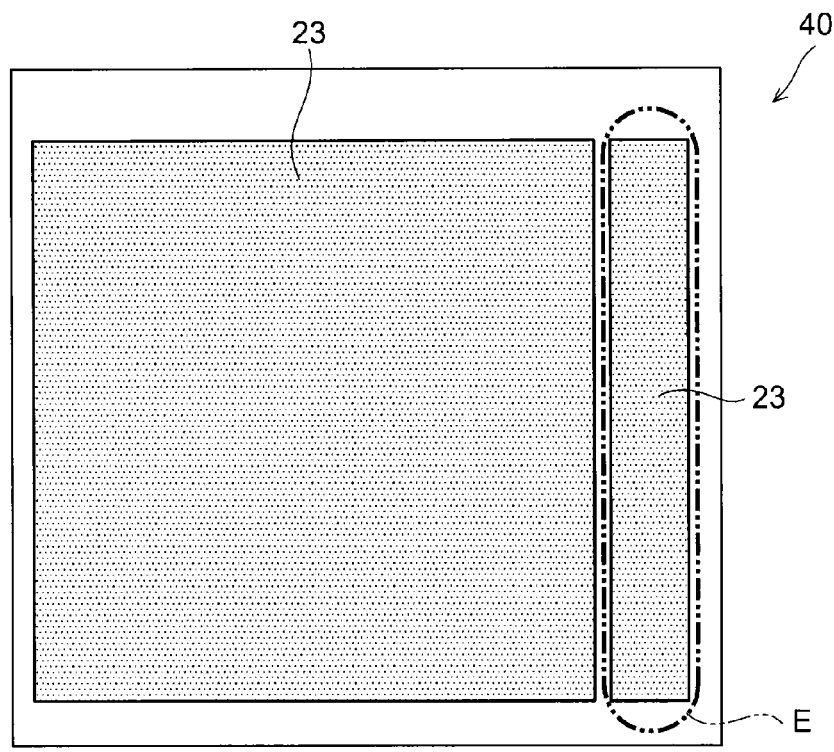
FIG. 18 is a plan view illustrating a method for extracting a modification requiring portion in the initial layout.

For instance, as shown in FIG. 17B, in region C, the core material pattern is a line-and-space (L/S) pattern. Thus, it is expected that the deposition amount of the sidewall material is uniform. In contrast, as shown in FIG. 17C, in region D, the core material pattern is bent. Thus, it is expected that the deposition amount of the sidewall material is nonuniform. Accordingly, in the embodiment, as shown in FIG. 18, region E where the core material pattern is bent in region D is extracted as a modification requiring portion.

Here, the extraction of the modification requiring portion may be performed by extracting a processing critical point by simulation. The extraction of the modification requiring portion may be performed manually by an engineer, or automatically by a computer.

Next, as shown in step S23 of FIG. 16, an auxiliary pattern such as SRAF (sub-resolution assist features) and dummy pattern is inserted as necessary into the initial layout 40 of the exposure mask. This process may be omitted if not necessary.

Next, as shown in step S24, variables representing the edge shape of the core material pattern included in the initial layout 40 are specified.

Figure 19:
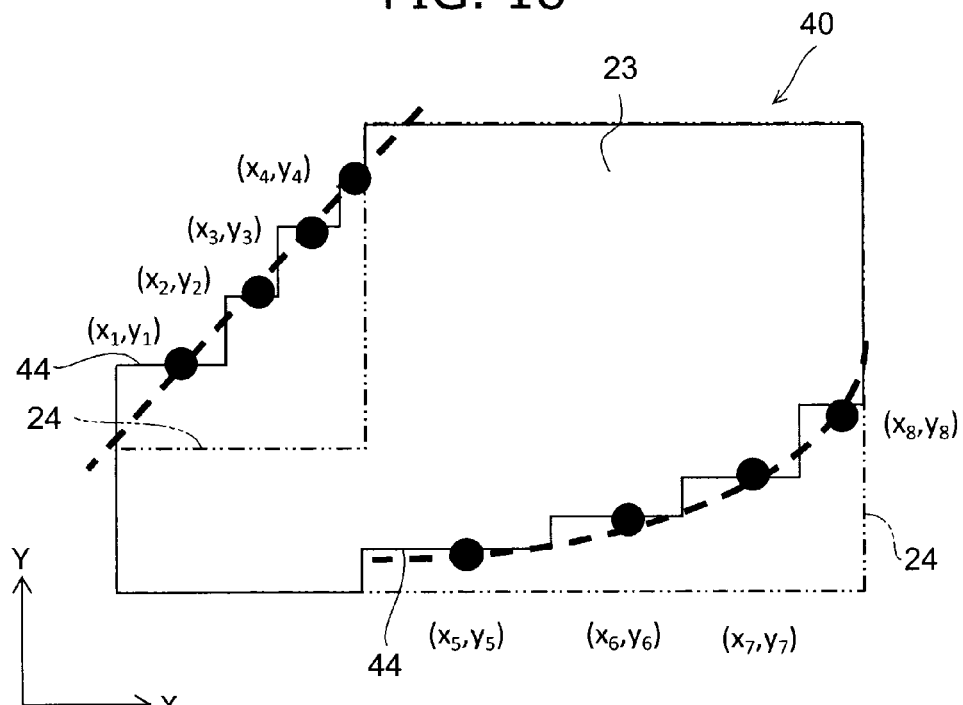
FIG. 19 is a plan view illustrating variables representing the edge shape of the core material pattern.

As shown in FIG. 19, it is assumed that the edge 24 of the core material pattern 23 included in the initial layout 40 is partly modified in shape and turned into a new edge 44. Here, the region where the edge of the core material is modified is the region including the modification requiring portion extracted in step S22.

The displacement amount between the edge 24 of the initial layout 40 and the new edge 44 is represented by a variable. For instance, as shown in FIG. 19, the edge of the core material pattern is shaped like a staircase. The mode of partition of the edge and the displacement amount of each stair are given by variables. For instance, the coordinates (x, y) of the midpoint of each partitioned line segment may be simply used as variables. In this case, the X coordinate of each midpoint indicates the mode of partition, and the Y coordinate indicates the displacement amount. However, in this case, the number of variables is large and increases the complexity in the later process.

Thus, approaches for reducing the number of variables may be adopted. In the following, such approaches are illustrated.

For instance, as shown in FIG. 20A, in the case where the edge of the core material pattern is shaped like a staircase, for each region, the width in the X direction of each stair may be made equal. This can reduce the number of variables representing the mode of partition.

Alternatively, as shown in FIG. 20B, for each region, the width in the X direction of each stair may be represented by a sequence formula. For instance, the width of the stairs may be set to 350 nm, 300 nm, 250 nm, 200 nm, 150 nm, 100 nm, and 50 nm. Then, the width W(t) of each stair can be represented by the sequence formula of W(t)=350−50(t−1) [nm], t=1, 2, 3, ..., 7. In this case, the variables are only the first term 350, the common difference 50, and the number of terms 7. This can also reduce the number of variables representing the mode of partition.

Alternatively, as shown in FIG. 21A, the edge of the core material pattern may be defined by a curve, and this curve may be represented by variables. In the example shown in FIG. 21A, the curve is represented by eleven variables.

Alternatively, as shown in FIG. 21B, the curve shown in FIG. 21A can be represented by an exponential function $y=a \times x^b + c$. In this case, three variables a, b, and c are sufficient for representing the X coordinate and the Y coordinate.

The method for specifying variables is not limited to these methods. For instance, the partitioning point may be provided in reference to the foot of the normal from the vertex of the surrounding core material pattern. Alternatively, the partitioning point may be provided in reference to the vertex of the core material pattern itself. In the case where an auxiliary pattern is provided in step S23, the shape of the edge of the auxiliary pattern may be included in the variables.

Next, as shown in step S25 of FIG. 16, a cost function is specified. The cost function is a function representing the degree that the formed wiring satisfies the prescribed requirement. For instance, the cost function is a function representing at least one of ease of lithography and the quality of the processed wiring shape. To the cost function, the term of a penalty function representing various constraints may be added so that in the case where these constraints are violated, the value of the cost function is significantly changed to the direction indicating badness.

For instance, for the initial layout 40 shown in FIGS. 17A to 17C, it may be considered that lithography is easy because of its high faithfulness. In this case, the cost function can be a function representing the quality of the processed wiring shape without considering the variation due to lithography. The cost function "cost" is e.g. the function expressed in the following Equation 2. For the cost function expressed in the following Equation 2, as its value becomes higher, it can be determined that the shape of the processed wiring is better.

$$\text{cost} = \min(\text{min space}, \text{min width}) - \text{penalty}((\text{open} + \text{short}) \times 100)$$
[Equation 2]

The first term on the right-hand side of the above Equation 2 is the value of the smaller of the minimum spacing between the wirings "min space" [nm] and the minimum width of the wiring "min width" [nm]. The second term on the right-hand side is a penalty function representing the occurrence of open defects "open" and short defects "short", defined as the number of occurrences of open defects and short defects multiplied by 100. The value of the above cost function "cost" becomes higher as the minimum of the spacing between the wirings "space" and the width of the wiring "width" becomes larger. However, if defects occur in the wiring, the value of the cost function is decreased by 100 per one defect by the penalty function. Thus, to obtain a high value of the cost function, the minimum of the wiring spacing and the minimum of the wiring width need to be made as large as possible on the condition that the occurrence of defects is completely eliminated.

Next, as shown in step S26 of FIG. 16, simulation is performed using the value of the variables specified in step S24. Thus, the shape of the wiring 21 formed based on the edge 24 is estimated to calculate the value of the cost function specified in step S25. As the simulation, for instance, one or both of simulation of lithography and simulation of wiring processing is performed. The simulation of wiring processing can be performed by e.g. the method described in the above third embodiment, i.e., the method of determining the deposition amount D of the sidewall material based on the aperture angle θ of each portion in two-stage sidewall technique.

Thus, the value of the cost function is calculated. For instance, as shown in FIG. 21B, the shape of the edge 24 of the core material pattern 23 is represented by an exponential function $y=a \times x^b + c$. In this case, in the initial layout 40, the edge 24 is a straight line of y=0. Thus, the variables a, b, and c defining the above exponential function are all set to 0 (zero).

Figure 22A:
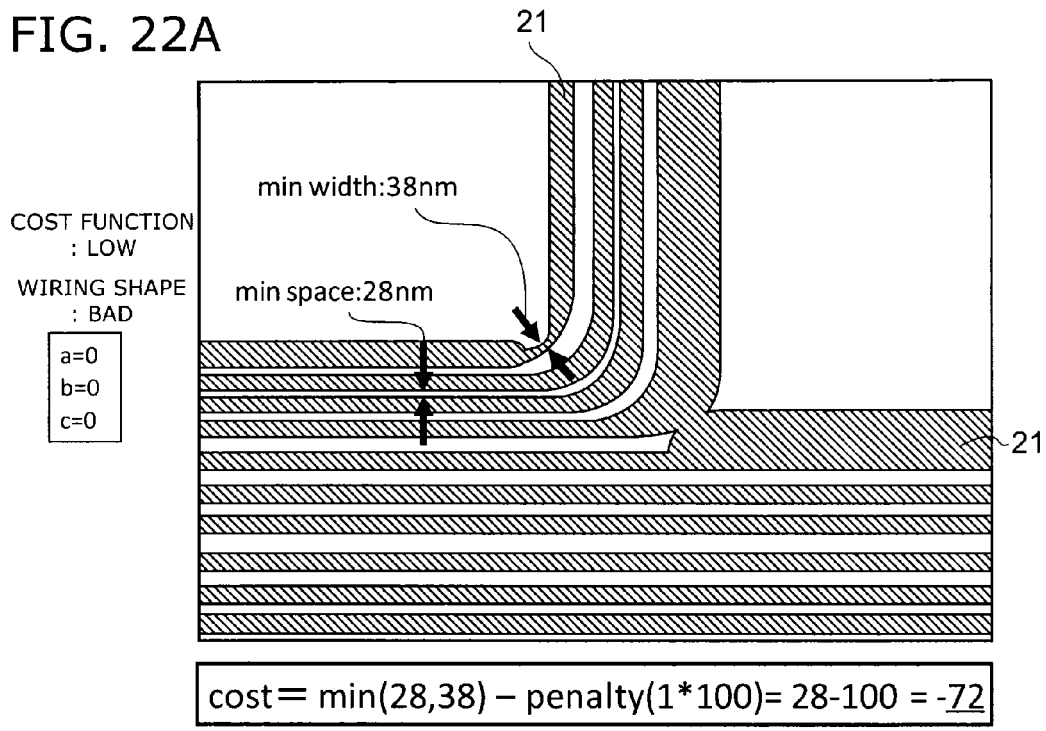
FIGS. 22A and 22B are plan views illustrating the simulation result of the shape of the wiring.

Under this condition, simulation of wiring processing is performed. As a result, as shown in FIG. 22A, suppose that the minimum spacing between the wirings "min space" is 28 nm, the minimum width of the wiring "min width" is 38 nm, and one short defect "short" occurs. In this case, the value of the cost function "cost" is cost=28−100=−72.

Next, in step S27 of FIG. 16, the quality of the wiring is determined using the value of the cost function calculated in step S26. In the above example, as the value of the cost function becomes higher, the wiring becomes better. Thus, for instance, the wiring is determined to be acceptable in the case where the value of the cost function is 30 or more. In the example shown in FIG. 22A, the value of the cost function is −72. Thus, this wiring is defective. Accordingly, the initial layout of the exposure mask is unacceptable (NG).

In the case where the determination in step S27 is unacceptable, the process proceeds to step S28. Then, an optimization algorithm is applied to modify the value of the variables. The variable is modified so that the shape of the wiring is varied to the direction indicating goodness, i.e., to the direction of improving the degree of satisfying the prescribed requirement. For instance, the above Equation 2 is used as the cost function. In this case, a combination of the variables a, b, and c is searched so that the value of the cost function becomes as high as possible. As the optimization algorithm, for instance, approaches such as GA (genetic algorithm), SA (simulated annealing), or polytope can be used.

Figure 23:
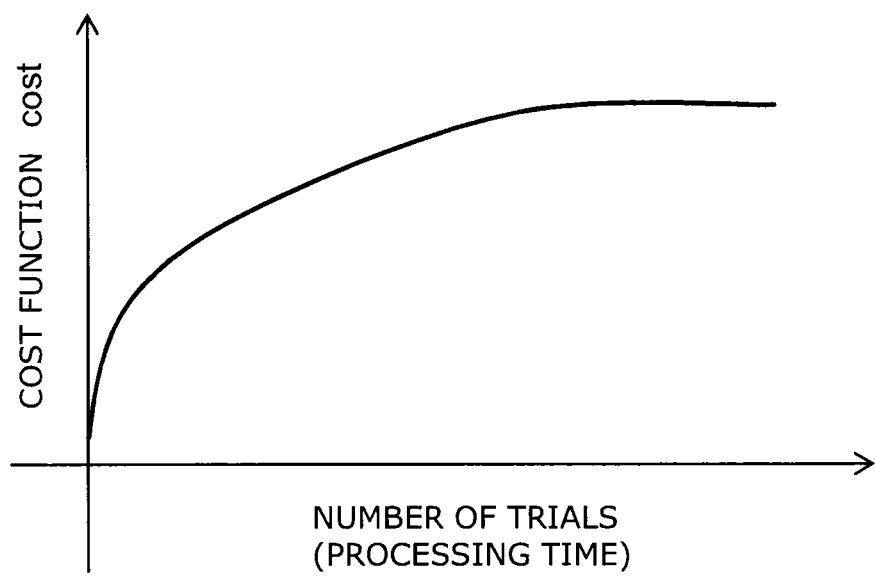
FIG. 23 is a graph illustrating the cost function varied by an optimization algorithm, where the horizontal axis represents the number of trials of the optimization algorithm, and the vertical axis represents the value of the cost function.

Next, returning to step S26, simulation is performed using the variables modified in step S28. Thus, the shape of the wiring is estimated to calculate the value of the cost function. Then, proceeding to step S27, determination is performed using the value of the cost function. Thus, until the value of the cost function exceeds a threshold, the loop composed of steps S26, S27, and S28 is cycled to repeat the trial of optimization. As shown in FIG. 23, in general, the value of the cost function increases with the increase in the number of trials, i.e., the number of cycles of the loop.

Figure 22B:
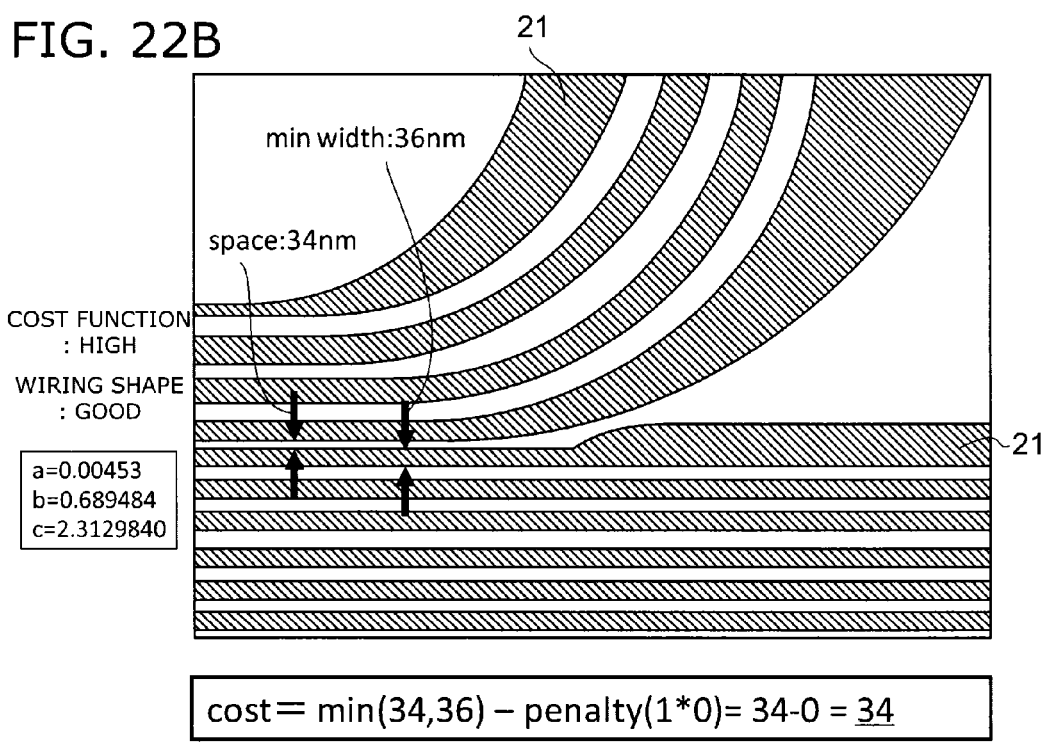

For instance, as shown in FIG. 22B, in the case of a=0.00453, b=0.689484, and c=2.3129840, suppose that the minimum spacing between the wirings "min space" is 34 nm, the minimum width of the wiring "min width" is 36 nm, and no open defects "open" and short defects "short" occur. In this case, the value of the cost function "cost" is cost=34−0=34, which exceeds the threshold. Thus, in step S27, it is determined to be acceptable (OK). In this case, as shown in FIG. 22B, each wiring 21 is gradually curved. For instance, the curvature radius is larger than the width of the wiring.

If the determination is acceptable, the process proceeds from step S27 to step S29. Then, based on the modified value of the variables, the shape of the edge 24 of the core material pattern 23 in the initial layout 40 is modified. Thus, a mask pattern is produced.

According to the embodiment, in step S21 of FIG. 16, an initial layout of an exposure mask for forming a core material for sidewall technique is specified. In step S24, variables representing the edge shape of the core material pattern are specified. In step S25, a cost function representing the quality of the shape of the wiring is specified. Then, by cycling the loop composed of steps S26, S27, and S28, the value of the variables are modified using an optimization algorithm so as to increase the value of the cost function. Thus, a mask layout improving the shape of the wiring can be produced.

In the example of the embodiment, as the value of the cost function becomes higher, the wiring shape becomes better. However, the cost function may be defined so that as the value of the cost function becomes lower, the wiring shape becomes better. In this case, in the process of step S28, the value of the variables is searched so that the value of the cost function becomes as low as possible.

In the example of the embodiment, in step S27 of FIG. 16, a threshold is specified, and the optimization processing is stopped if the value of the cost function exceeds the threshold. However, the embodiment is not limited thereto. For instance, also after the value of the cost function exceeds the threshold, the optimization processing may be continued until a predetermined processing time is expired. Alternatively, the optimization processing may be continued until the value of the cost function is maximized or minimized without setting the constraint of the processing time.

Furthermore, of the variables specified in step S24 of FIG. 16, the variables found to be less influential on the value of the cost function may be aggregated into one variable.

Next, a fifth embodiment is described.

The embodiment is an example of producing a mask layout by using an optimization algorithm to modify the initial layout. The embodiment assumes that the wiring is formed by normal RIE technique without using sidewall technique.

The integrated circuit device of the embodiment is an LSI (large scale integrated circuit).

The method for producing a mask layout according to the embodiment is also performed in accordance with the flowchart shown in FIG. 16.

Figure 24A:
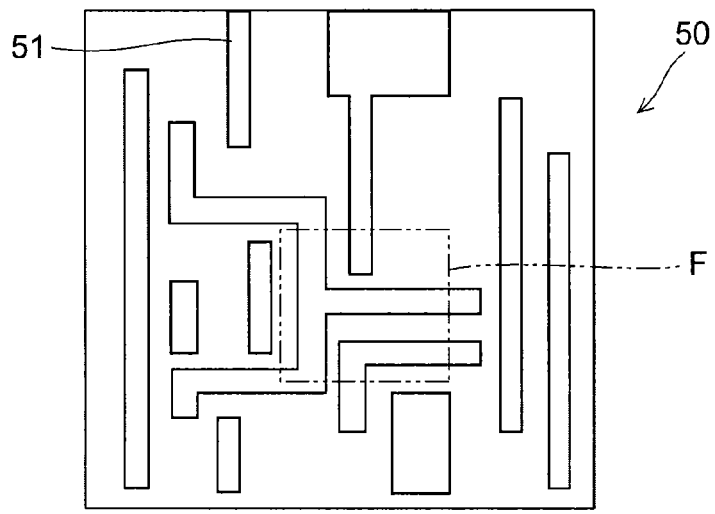
FIGS. 24A to 24C are plan views illustrating an initial layout of an exposure mask in a fifth embodiment.

First, as shown in step S21 of FIG. 16 and in FIG. 24A, an initial layout 50 of an exposure mask is specified. The initial layout 50 is provided with a wiring pattern 51. In manufacturing an integrated circuit device, the wiring pattern 51 of the exposure mask is transferred onto a wafer to form a mask material on a conductive film. Then, this mask material is used as a mask to perform anisotropic etching such as RIE. Thus, the conductive film is selectively removed to form wiring. Accordingly, the side surface shape of the formed wiring is affected by the edge shape of the wiring pattern 51 and by the lithography.

Next, as shown in step S22 of FIG. 16, LCC (lithography compliance check) is performed entirely on the initial layout 50 to extract a hot spot. The hot spot is a region not satisfying the predefined specification requirement. For instance, in the example shown in FIG. 24A, region F is extracted as a hot spot.

Figure 24B:
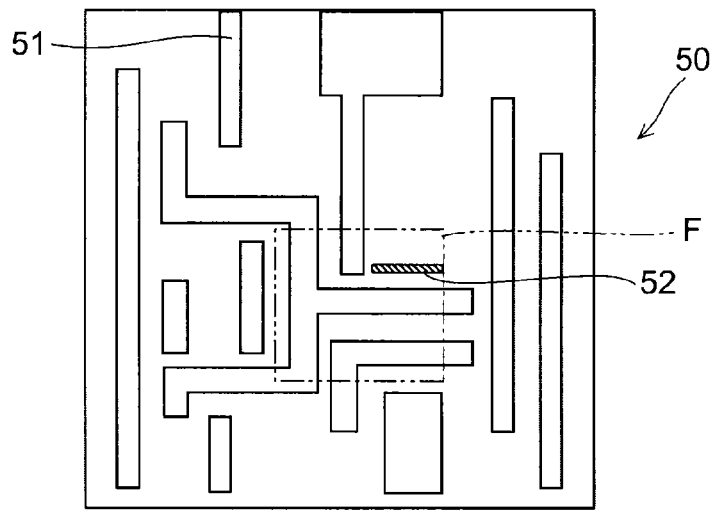

Next, as shown in step S23, an auxiliary pattern such as SRAF and dummy pattern is inserted as necessary into the region F of the initial layout 50. For instance, as shown in FIG. 24B, an SRAF 52 is inserted into the free space between the wiring patterns 51.

Figure 24C:
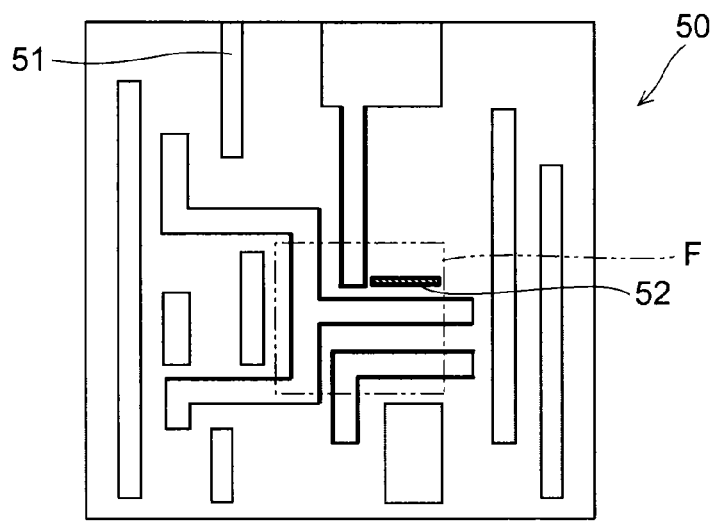

Next, as shown in step S24 and FIG. 24C, in the region F and its surrounding region (e.g., the region within a distance of 50 nm or less from the outer border of the region F) of the initial layout 50, variables representing the edge shape of the wiring pattern 51 are specified. The method for specifying the variables is similar to e.g. the above fourth embodiment. Furthermore, variables are also specified for the edge of the SRAF 52.

Next, as shown in step S25, a cost function is specified. In the embodiment, the cost function is a function representing ease of lithography. For instance, a plurality of optical image models are assumed in which the dose amount and focus in exposure are each varied. Then, evaluation indices indicating the lithographic margin of these optical image models are assumed. The evaluation indices can include e.g. the minimum dimension of the wiring, presence or absence of open defects, presence or absence of short defects, presence or absence of the transfer of SRAF (side lobe), deviation from the target shape (CD (critical dimension) error amount), EPE (edge placement error), ED tree, LEPB (line end pull back), process window, contact coverage and the like. The cost function is specified by using one of these evaluation indices or by combining a plurality of evaluation indices. With regard to the cost function, only one cost function may be specified for single purpose optimization. Alternatively, a plurality of cost functions may be specified for multi-purpose optimization. The above evaluation indices may be independently evaluated. For instance, as the cost function, the following Equation 3 can be specified.

$$\text{COST} = \min\left(\frac{\text{min space}}{\text{min space } spec}, \frac{\text{min width}}{\text{min width } spec}, \frac{\max ErrCD \ spec}{\max ErrCD},\right.$$
$$\left.\frac{\max LEPB \ spec}{\max LEPB}, \frac{\text{min Coverage}}{\text{min Coverage } spec}\right) -$$
$$1 \times \text{penalty(open, short, side} - \text{lobe)}$$

[Equation 3]

In the above Equation 3, (min space)/(min space spec) represents the value of the ratio of the simulation value to the specification value of the minimum wiring-to-wiring distance, (min width)/(min width spec) represents the value of the ratio of the simulation value to the specification value of the minimum wiring width, (max ErrCD spec)/(max ErrCD) represents the value of the ratio of the specification value to the simulation value of the maximum CD error amount, (max LEPB spec)/(max LEPB) represents the value of the ratio of the specification value to the simulation value of the maximum line end pull back amount, and (min Coverage)/(min Coverage spec) represents the value of the ratio of the simulation value to the specification value of the minimum coverage. The first term on the right-hand side of the above Equation 3 represents the minimum of these values of the ratios. The second term on the right-hand side is a penalty function with regard to open defects, short defects, and side lobes. If any one of these defects occurs, the value on the right-hand side is decreased by 1.

Next, as shown in step S26, optical simulation is performed on each of the above plurality of optical image models. Thus, the shape of the wiring formed based on the wiring patter 51 included in the initial layout 50 is estimated to calculate the value of the cost function. In the embodiment, no simulation on wiring processing is performed. Then, in step S27, determination is performed using the value of the cost function.

Figure 25A:
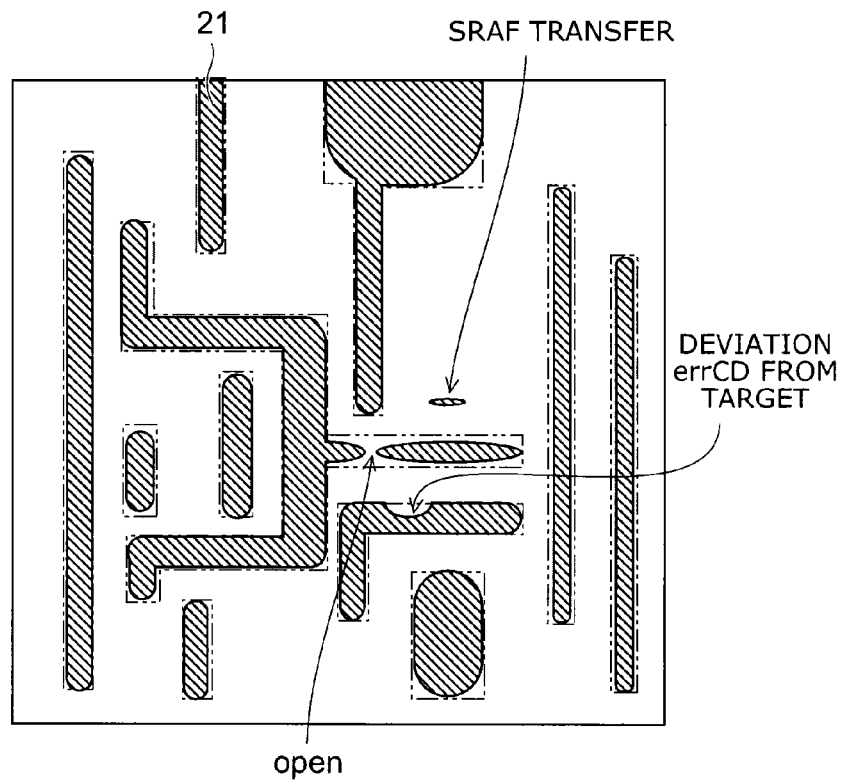
FIGS. 25A and 25B are plan views illustrating the simulation result of the shape of the wiring.

For instance, as shown in FIG. 25A, an open defect and an SRAF transfer (side lobe) may occur in the wiring obtained by simulation. Furthermore, the CD error amount representing the degree of deviation from the target shape may be large. In this case, the cost function is made lower, and the determination is unacceptable (NG).

In this case, the process proceeds from step S27 to step S28. Then, an optimization algorithm is applied to modify the value of the variables. Here, in the case where a plurality of cost functions are specified, a multi-purpose optimization algorithm may be used to evaluate each cost function. It is also possible to use a response surface technique for using an approximate function to model the correlation between the combination of inputted variables and the outputted value of the cost function. This can omit machine simulation occupying a large proportion of processing time to immediately calculate the value of the cost function.

Then, returning again to step S26, optical simulation is performed to calculate the cost function. Thus, in step S27, determination is performed.

Figure 25B:
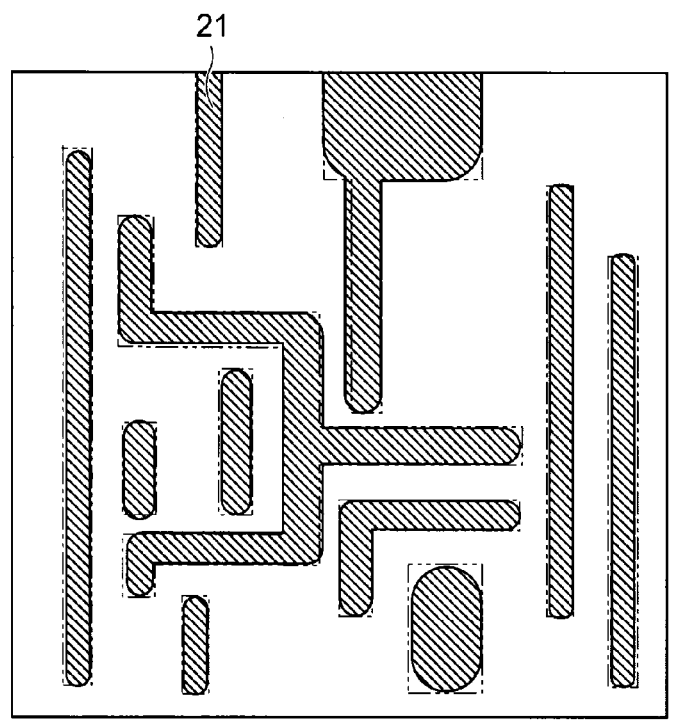

For instance, as shown in FIG. 25B, the wiring obtained by simulation based on the modified variables may be free from open defects, short defects, and SRAF transfers, and the maximum CD error amount may be decreased. In this case, the value of the cost function is made higher, and the determination is acceptable (OK).

In this case, the process proceeds from step S27 to step S29. Then, based on the modified value of the variables, the edge shape of the wiring pattern in the initial layout 50 is modified. Thus, a mask pattern is produced.

Also in the embodiment, a mask layout improving the shape of the wiring can be produced. The configuration and effect of the embodiment other than the foregoing are similar to those of the above fourth embodiment.

In the method for producing a mask layout according to the above fourth and fifth embodiments, for instance, the process shown in steps S26-S29 of FIG. 16 can be implemented by controlling a computer by a program. As the computer, for instance, a general-purpose personal computer can be used.

For instance, the process of steps S21-S25 of FIG. 16 is performed manually or by another computer. The types of variables and the cost function are incorporated in this program in advance. Then, the data representing the initial layout and the modification requiring portion are inputted to a computer. Subsequently, the computer is caused to perform the process shown in steps S26-S29.

In this case, the program is a program for producing a mask layout of an exposure mask for forming wiring of an integrated circuit device. The program causes the computer to execute the following procedures <1>-<4>.

<1> Procedure of estimating the shape of the wiring formed based on the edge of the pattern included in the initial layout of the exposure mask by calculating the value of the cost function representing the degree that the shape of the wiring satisfies the prescribed requirement (step S26).

<2> Procedure of determining whether the estimated shape of the wiring satisfies the above requirement based on the value of the cost function calculated in the above procedure <1> (step S27).

<3> Procedure of modifying the variables representing the shape of the edge using an optimization algorithm so that the value of the cost function is changed to the direction of improving the above degree in the case where it is determined that the above requirement is not satisfied in the above procedure <2> (step S28).

<4> Procedure of modifying the shape of the edge based on the modified value of the variables in the case where it is determined that the above requirement is satisfied in the above procedure <2> (step S29).

Here, the specification of the initial layout shown in step S21 of FIG. 16, the extraction of the modification requiring portion shown in step S22, and the addition of an auxiliary pattern shown in step S23 may also be performed in the same computer by the above program. In this case, for instance, the computer retrieves the layout of the wiring from a database and the like. Thus, in accordance with a prescribed algorithm, the computer specifies the initial layout, extracts the modification requiring portion, and adds an auxiliary pattern as necessary.

The above second to fifth embodiments may be performed in combination with each other. For instance, in the process of modifying the k-th edge shown in step S9 of FIG. 2, the above second and third embodiments may be performed as described in the above fourth and fifth embodiments. That is, variables representing the shape of the edge may be specified. A cost function representing the shape of the wiring may be specified. Then, an optimization algorithm may be used to modify the value of the variables so that the value of the cost function is changed to the direction of goodness.

The embodiments described above can realize an integrated circuit device, a method for producing a mask layout, and a program for producing a mask layout in which defects of wiring are less likely to occur despite miniaturization.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A method for producing a mask layout of an exposure mask for forming wiring of an integrated circuit device, comprising:

estimating, by a processor, shape of the wiring formed based on an edge of a pattern included in an initial layout of the exposure mask, wherein the shape of the wiring formed based on one of a plurality of edges of the pattern is estimated; and modifying, by a processor, shape of the edge if the estimated shape of the wiring does not satisfy a requirement, wherein the shape of the one edge is modified, the estimating and the modifying are repeated until the wiring with the estimated shape satisfies the requirement, the repeating is performed in order of arrangement of the edges for all the edges included in the initial layout; and further comprising producing the mask layout of the exposure mask based on the modified shapes of all of the edges after the repeating.

2. The method according to claim 1, wherein the estimating includes calculating value of a cost function representing a degree that the shape of the wiring satisfies the requirement, and the modifying includes modifying a variable representing the shape of the edge so that the value of the cost function is changed to a direction of improving the degree.

3. The method according to claim 2, wherein in the modifying a variable, an optimization algorithm is used.

4. The method according to claim 2, wherein a plurality of the cost functions are specified, and in the modifying a variable, a response surface is used.

5. The method according to claim 1, wherein the requirement includes that curvature radius of the wiring is more than or equal to a prescribed value.

6. The method according to claim 1, wherein the requirement includes that spacing between the wirings is more than or equal to a prescribed value.

7. The method according to claim 1, wherein the requirement includes that the wiring is free from open defect and short defect.

8. A method for producing a mask layout of an exposure mask for forming wiring of an integrated circuit device, comprising:

estimating, by a processor, shape of the wiring formed based on an edge of a pattern included in an initial layout of the exposure mask; and modifying, by a processor, shape of the edge if the estimated shape of the wiring does not satisfy a requirement;

wherein the wiring is formed by sidewall technique, the pattern is a core material pattern for forming a core material used for the sidewall technique, and the estimating includes determining a distribution of deposition amount of sidewall material deposited on a side surface of the core material; and further comprising producing the mask layout of the exposure mask based on the modified shape of the edge after the modifying.

9. The method according to claim 8, wherein the distribution of deposition amount is determined based on an aperture angle at the side surface of the core material.

* * * * *